United States Patent
Patil et al.

(10) Patent No.: US 12,536,717 B2
(45) Date of Patent: Jan. 27, 2026

(54) AUTOMATING MECHANICAL DRAFTING WORKFLOWS WITH GEOMETRY QUANTIZATION

(71) Applicant: Autodesk, Inc., San Francisco, CA (US)

(72) Inventors: Varun Vijayrao Patil, Pune (IN); Subash Thangavel, Tiruchengode (IN); Yash Sunil Morey, Pune (IN)

(73) Assignee: AUTODESK, INC., San Francisco, CA (US)

( * ) Notice: Subject to any disclaimer, the term of this patent is extended or adjusted under 35 U.S.C. 154(b) by 190 days.

(21) Appl. No.: 18/475,547

(22) Filed: Sep. 27, 2023

(65) Prior Publication Data

US 2025/0104301 A1    Mar. 27, 2025

(51) Int. Cl.
*G06T 11/20*    (2006.01)
*G06F 30/12*    (2020.01)
*G06T 11/60*    (2006.01)

(52) U.S. Cl.
CPC ............ *G06T 11/206* (2013.01); *G06F 30/12* (2020.01); *G06T 11/60* (2013.01); *G06T 2210/12* (2013.01)

(58) Field of Classification Search
CPC ... G06T 11/206; G06T 11/60; G06T 2210/12; G06F 30/12
See application file for complete search history.

(56) References Cited

U.S. PATENT DOCUMENTS

2015/0040661 A1*  2/2015  Olson ................. G01F 23/0023
                                                     73/313
2017/0262418 A1   9/2017  Lopez

OTHER PUBLICATIONS

Extended European Search Report dated Sep. 9, 2024 for European Patent Application No. 24166639.5.
Buric, M., et al., "Towards Automated Drafting in CAD Systems", EEET 2021, pp. 233-238.
Raffaeli, R., et al., "Automation of Drafting Execution by Schemes Definitions and Feature Recognition", Computer-Aided Design & Applications, 2016, pp. 1-15, vol. 13(a).

* cited by examiner

*Primary Examiner* — Haixia Du
(74) *Attorney, Agent, or Firm* — Gates & Cooper LLP

(57) ABSTRACT

A method and system provide for automating drawing. A drawing of two or more entities is obtained and a resolution is determined. Based on the resolution, the drawing is quantized into a cell map. The cell map is a collection of multiple cells stored in a contiguous memory. Each of the multiple cells is quantized geometry data for and provides a smallest tangible unit of information about a corresponding entity. Each of the multiple cells is a number that represents domain specific information about the corresponding entity. The quantizing rounds off of values beyond a specified threshold to a resolution tolerance of the resolution. The cell map is utilized to automate modifications to the drawing.

22 Claims, 38 Drawing Sheets

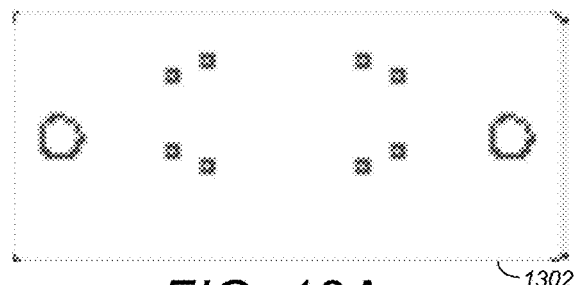
FIG. 13A
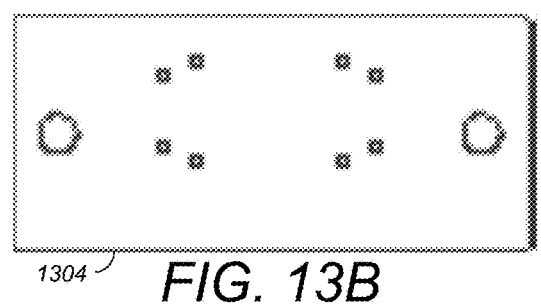
FIG. 13B
FIG 13C
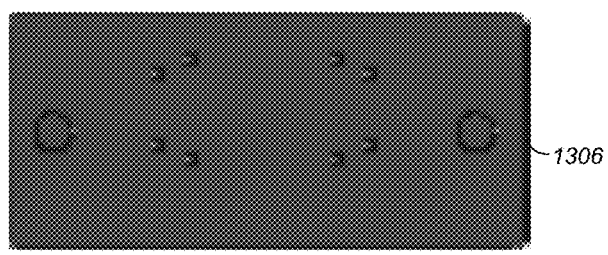
FIG. 13D
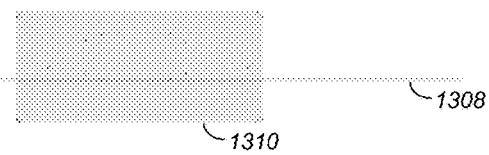
FIG. 13E
FIG. 13F
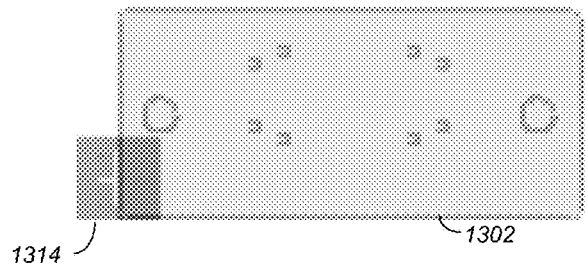
FIG. 13G
FIG. 13H
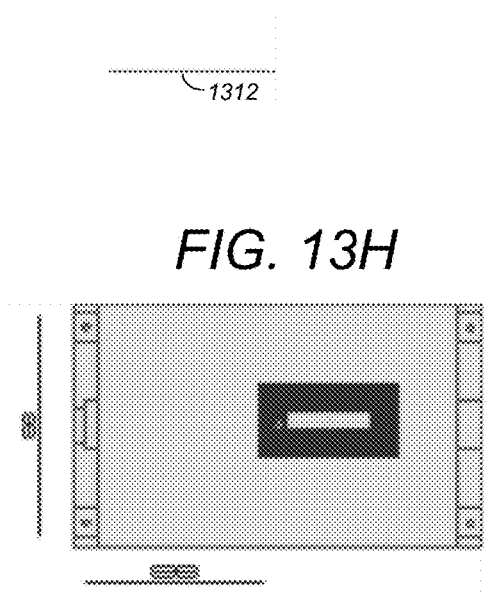
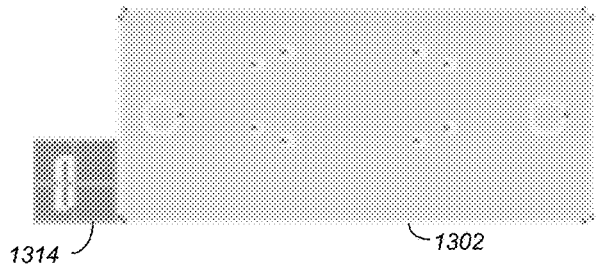

AUTOMATING MECHANICAL DRAFTING WORKFLOWS WITH GEOMETRY QUANTIZATION

BACKGROUND OF THE INVENTION

1. Field of the Invention

The present invention relates generally to computer aided design (CAD), computer aided manufacturing/modeling (CAM), computer aided engineering (CAE), and printed circuit board design software applications, and in particular, to a method, apparatus, system, and article of manufacture for automating the drafting of drawings in such applications.

2. Description of the Related Art

Human intuition drives most of the drafting decisions in CAD/CAM/CAE/printed circuit board design software applications. Drafting decisions may include, for example, which orthographic view should be placed for a component, where views should be placed on a sheet and at what scale, where should a long part be broken. Without human intuition, or at least a way to mimic it, any drawing automation of the above may fall short. In addition, in the drafting/drawing domain, the geometric data structures that hold the information, such as BREPs (boundary representations), viewports, BlockTableRecords, and geometry data structures (e.g., lines, arcs, and circles), are too rich for automation. Thus, it is desirable to automate drawing/drafting workflows that either need subject-matter expertise or consume time.

With current rich-data, it is difficult to perform human-centric automations. It is desirable to have technology that is light weight, fast, flexible, and puts human/draftsman at the core of the automation.

To streamline the drafting/drawing process, prior art systems have traditionally utilized templates. A drawing sheet is stamped out/generated using a template and all aspects/attributes of the drawing sheet are dependent on how the particular template is configured. However, a user is responsible for determining which attributes are needed, which scale a component is needed at, which aesthetic aspects are desired, and then manually determining and utilizing the template that provides such properties.

To better understand the problems of the prior art, an exemplary drafting scenario may be useful. Suppose a user desires to utilize a fixed size of paper (e.g., A3) and desires to scale down a drawing (and parts/components in the drawing) to fit onto the paper. Also users may add other views, making the initial scale wrong as we need to accommodate more data on the sheet. In such cases, we need to re-scale the views accordingly. Another example is, a larger component may not fit onto a drawing sheet and it may be desirable to break/split that larger component and remove geometry that is repetitive (e.g., along a long flat surface or tube in which the geometry does not change). Unfortunately, the prior art fails to provide an efficient and accurate mechanism for identifying such repetitive geometric areas and/or for scaling down a drawing and its parts/components.

SUMMARY OF THE INVENTION

Embodiments of the invention automate drawing/drafting workflows that either need subject-matter expertise or consume time. In this regard, embodiments of the invention provide for geometry quantization as a way of representing mechanical-drawing data in a quantized form (referred to herein as a "geometric cell map" or "cell map"). Cell maps maintain geometry and domain-specific information in the form of a contiguous array of "Geometry Cells". Cell maps are highly efficient in approximating drafting-specific tasks and inferring/building a draftsman's intuition within an application. With the quantization process, highly accurate spatial information may be lost but domain-information is retained. Further, because "humans" read drawings, losing this spatial information does not cause a problem as humans cannot comprehend the much highly accurate spatial information to a $10^6$ tolerance on a piece of paper anyways.

BRIEF DESCRIPTION OF THE DRAWINGS

Referring now to the drawings in which like reference numbers represent corresponding parts throughout:

FIGS. 13A-13H illustrates an exemplary cell map auto arrangement in accordance with one or more embodiments of the invention;

DETAILED DESCRIPTION OF THE INVENTION

Figure 1:
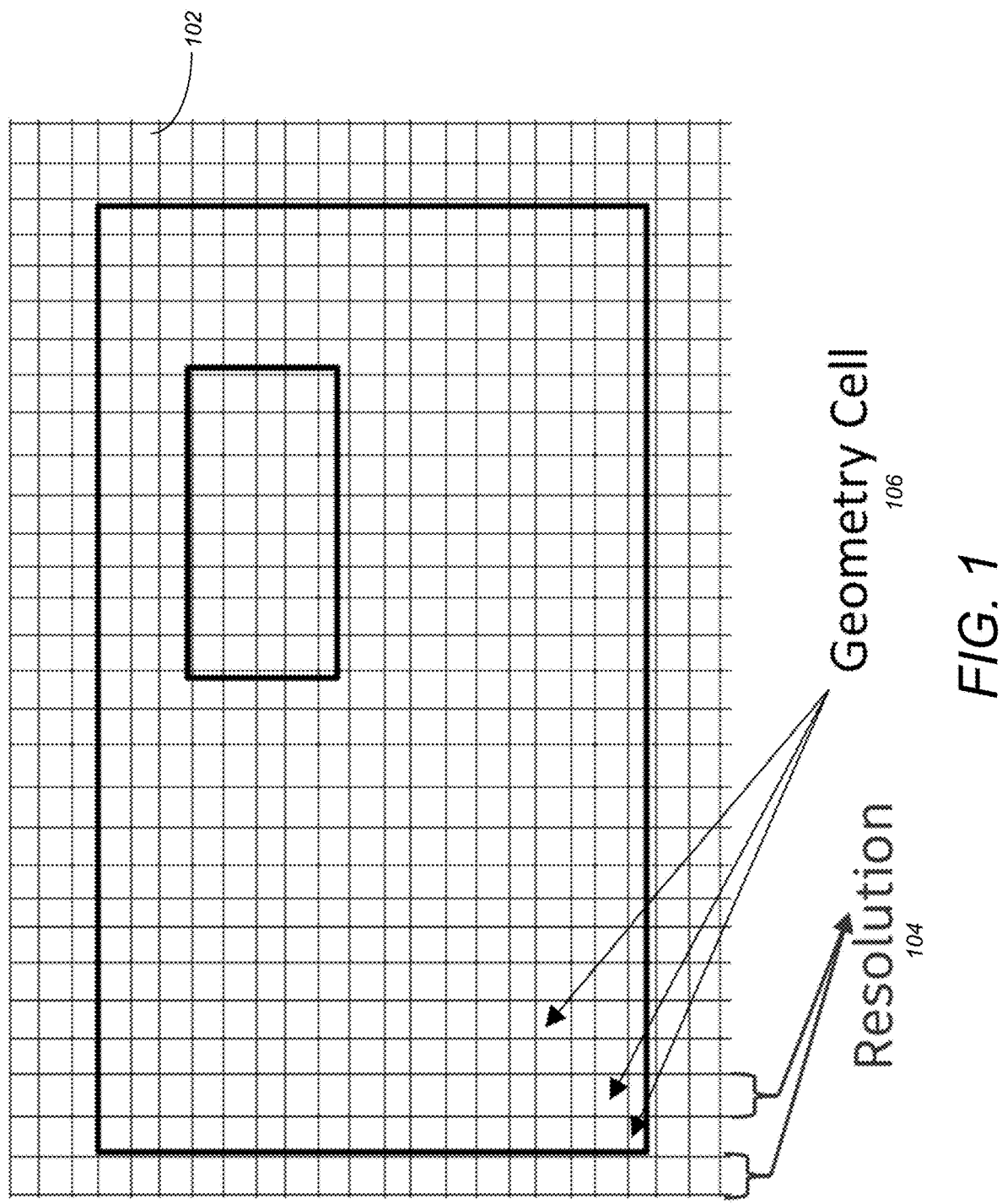
FIG. 1 illustrates the quantized form of a cell map in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Understanding morphology will help build human intuition which is necessary to automate complicated workflows. Accordingly, embodiments of the invention attempt to understand the morphology of a part in a way that a draftsman understands it. Existing data structures that store geometry information like BREP/Viewport/BlockTableRecords are better in providing drafting features. While these data structures are information rich, they are not suitable for automation. Accordingly, embodiments of the invention augment existing geometry data structures with something more suitable for automation. Quantization is the process where the geometry data is "dumbed down" in a way that makes the geometry understandable as a human would. The quantized geometry provides faster and efficient data representation needed for automation.

To provide such quantization, embodiments of the invention provide cell maps. It may be noted that the quantization of geometry happens on paper space. Such paper space is where values are rounded off with some "resolution" factor. In this regard, the resolution is a function of paper size and/or user preference. In quantization, the lineage and other domain-specific information about geometry entities are kept intact. The smallest tangible unit of the information is called the "cell" and the collection of such cells is called the "cell map".

Cell maps that are utilized to approximate drafting specific tasks and inferring/building a draftsman's intuition. Capabilities resulting from the use of such cell maps include automation, the building of human intuition and judgment, and aesthetics.

Automation: Once the morphology of a part is understood, the automation of the workflow may be easier. For example, the number of orthographic views needed to fully define a part may be determined. As humans, we can easily understand and answer the question by just looking at a part, because we look at the part, not at its edges, faces, and vertices. Instead, humans look at a part as a whole and understand what shape it is and which views would make sense to convey full information about the part. Once the morphological features of a part are understood, it becomes clearer what views are needed.

Building Human Intuition and Judgment: The final consumers of a 2D (two-dimensional) drawing are humans (e.g., other engineers). The human brain acts as an interpreter that can read and decode a mechanical drawing. While creating a drawing, draftsman implicitly understand this fact and take some creative shortcuts. For example, if features-to-detail are located at the end of a "long part", a draftsman usually breaks the part where nothing is happening and a reader would still understand the geometry of the part. The same is true if the long part has repetitive patterns—breaking such a part also would make sense. Accordingly, embodiments of the invention, as software, build human intuition that can mimic what a draftsman would do. Morphological processing and analysis of quantized data help build such human intuition.

Aesthetics: As established, mechanical drawings are ultimately read by humans. Aesthetics and readability are important aspects. Draftsmen typically have to spend considerable time in moving and arranging the views and annotations to make drawings look good on the paper. Embodiments of the invention help make the drawings more aesthetically pleasing and may even take client's preferences into account during this process. For example, embodiments of the invention may auto-arrange dimensions without them overlapping each other or any part geometry.

In view of the above, exemplary capabilities of embodiments of the invention may include (1) actions inside of the drawing workflow such as auto views, auto arrangement of annotations, and autobreak; and (2) actions outside of the drawing such as faster nesting algorithms, and/or the arrangement of dimensions inside the modeling workspace. The following provide further details regarding some of the exemplary capabilities that may be provided in accordance with one or more embodiments of the invention:

(1) AutoBreak: with the help of cell maps, embodiments of the invention can find information entropy and redundancy. A cell map may be thought of as a geometrical-image-snapshot, where the information is condensed in 64 bits rather than a conventional image-pixel (picture-cell) 24 bits. Redundancy may be identified in a "long part", and embodiments may break the "long part" if the information redundancy extends beyond a threshold.

(2) Overlap Detection and Automatic Arrangement: As the information is laid out in contiguous memory, it is extremely efficient to do some Boolean operations on this data. Embodiments can quickly find out if some objects overlap with one another and after detecting such overlap, embodiments can quickly find a better place for these objects where they don't overlap. This Quantized Geometry may be used to automatically arrange the dimensions, hole and thread notes, and other annotations. The cell map may also be used to automatically nest the views on a sheet and scale them up and down if they overlap.

(3) Dimensioning algorithms and finding unique sections, loops, symmetry, and intersections. In the dimensioning algorithms, which help with auto-dimensioning, the geometric cell maps are used to explode loops and start dimensions per loop instead of the entire view. Per loop dimension mimics what draftsmen do while manually dimensioning. At a loop level, embodiments of the invention can quickly identify/find the symmetry of these loops, and such an identification may help reduce the redundant dimensions on symmetric geometry. Embodiments of the invention may also overlay one drawing view on top of another drawing view of the same component. With such capability, embodiments can identify if the geometry is identical and figure out the portion of geometry which is distinct. Such an identification can help dimension the Boolean intersection of the view mimicking what draftsmen do.

Additional Description of the Problem

Rich-geometry data powers all the user facing functionality of drawings. Data like face ID, feature ID, entity specific information like coordinates of end points, control points, center points, arc points, transformations, etc. are the backbone of all the drawing functionality. However, for automation, geometry information particularly in the current form is not optimal. It is extremely difficult or sometimes impossible to build human centric logic required in the drawing domain with the current data. For example, it may be difficult, if not impossible to determine if an annotation overlaps with a view, or how to determine if breaks can be applied to a part automatically.

To understand the problems, it may be useful to differentiate videos and drawings. With videos: (1) humans are the consumers; (2) the recording of a video could happen at a higher frame-rate, but (3) human constraints exist—an image stays on the retina for $1/20^{th}$ of a second, thus videos could be streamed at 24 FPS (frames per second); i.e., (4) a video is streamed temporally quantizing or sampling a second with 24 images. With drawings: (1) humans are the consumers; (2) the actual model may contain information at the $10^{-6}$ tolerance, but (3) human constraint—users cannot see less than line thickness, thus, excess information can be removed; and (4) that is why embodiments of the invention can spatially sample/quantize the view/sheet by some resolution factor.

Quantization

Geometry quantization is a way of representing the mechanical-drawing data in a quantized form. As used herein, this form is referred to as a geometric cell map or cell map. Cell maps maintain geometry and domain-specific information in the form of a contiguous array of cells (also referred to as geometry cells). Cell maps are highly efficient in approximating drafting-specific tasks and building a draftsman's intuition. With the quantization process, spatial information may be lost but does not cause a problem as humans cannot comprehend the much higher spatial information in $10^{-6}$ tolerance on a piece of paper.

The terminology used herein may have the following meanings:

Resolution: A resolution of a cell map defines the dimension of a single unit of the sample. Resolution is generally a function of a final memory footprint that one might have after sampling the data performance characteristics required by that particular application (resolution factor and performance are inversely proportional). Application requirements may differ in that some cell map applications may require smaller resolution while other applications may work well without more data.

Geometry Cell: A geometry cell is quantized geometry data representing information in a single square block of resolution unit. It is the smallest tangible unit of information about a certain entity. A cell is generated from quantizing/sampling/discretizing geometry entities. Further, a geometry cell may consist of a 64-bit value/number that represents the domain-specific information about the entity.

Geometry cell map/cell map: Cell maps are a collection of geometry cells stored in a contiguous array. Collectively, cell maps define an object in a quantized/discrete form. Further, a cell map is a function of a resolution factor.

FIG. 1 illustrates the quantized form of a cell map in accordance with one or more embodiments of the invention. The quantizing happens on paper-space 102. Embodiments of the invention round off values with $10^{-6}$ tolerance to something with a tolerance of a defined "resolution" 104. The lineage and other domain specific information about edges/points are kept intact. The cells 106 do not directly contain spatial information. However, the spatial information can be inferred by multiplying the current location of the cell 106 by the resolution 104.

Figure 2:
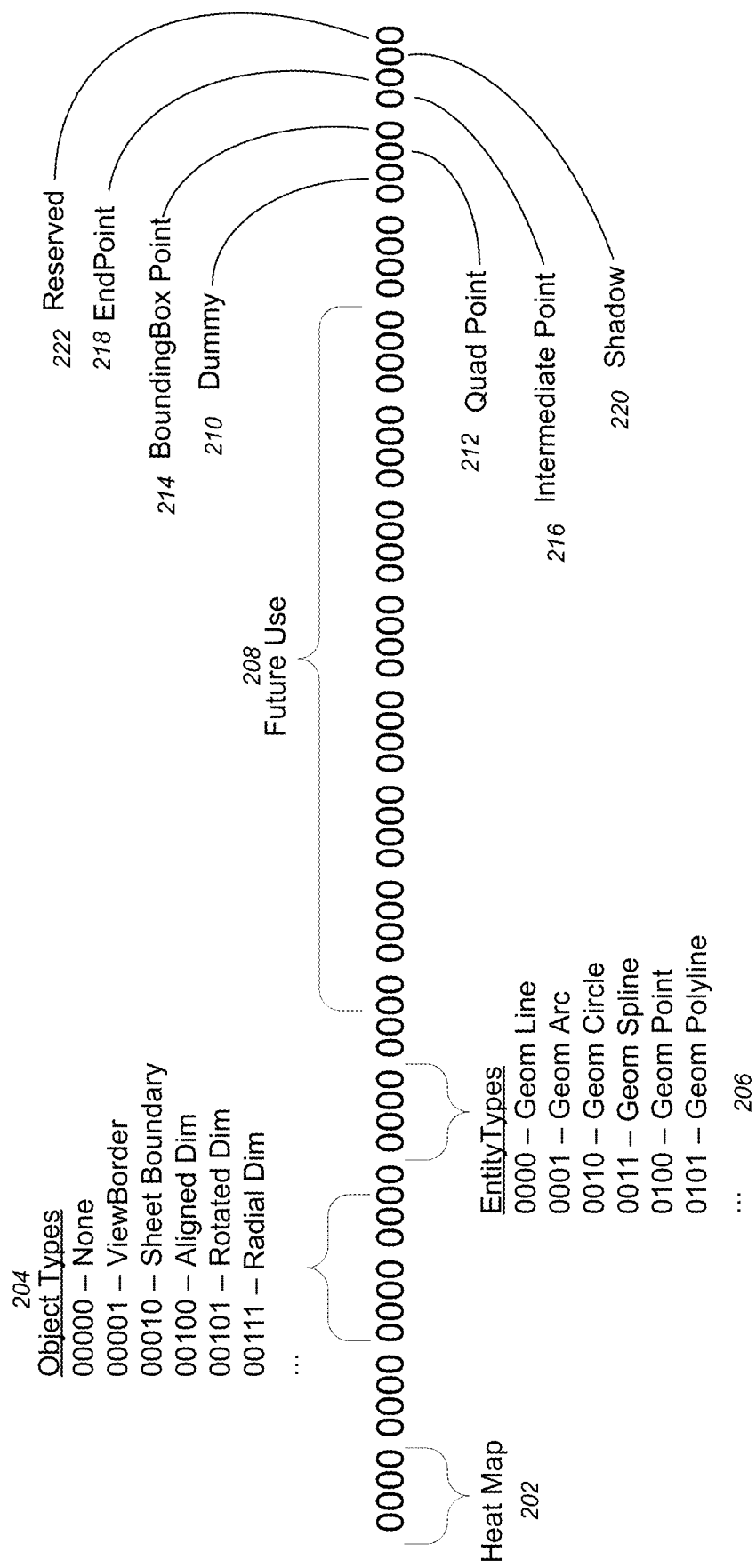
FIG. 2 illustrates an exemplary cell structure in accordance with one or more embodiments of the invention.

FIG. 2 illustrates an exemplary cell structure in accordance with one or more embodiments of the invention. The bit representations illustrated in FIG. 2 are merely exemplary and different quads/bits may represent different properties than that indicated. As illustrated quad 202 corresponds to the heat map while bits 204 represent the different object types in the cell (e.g., none, viewborder, sheet boundary, aligned dimension, rotated dimension, radial dimension, etc.). Bits 206 specify the entity type such as geometric line, geometric arc, geometric circle, geometric spline, geometric point, geometric polyline, etc. Bits 208 may be used for other (future) properties. Bits 210-222 may be used for various properties such as a dummy bit 210, quad point 212, bounding box point 214, intermediate point 216, endpoint 218, shadow 220, and a reserved bit 222.

Figure 3:
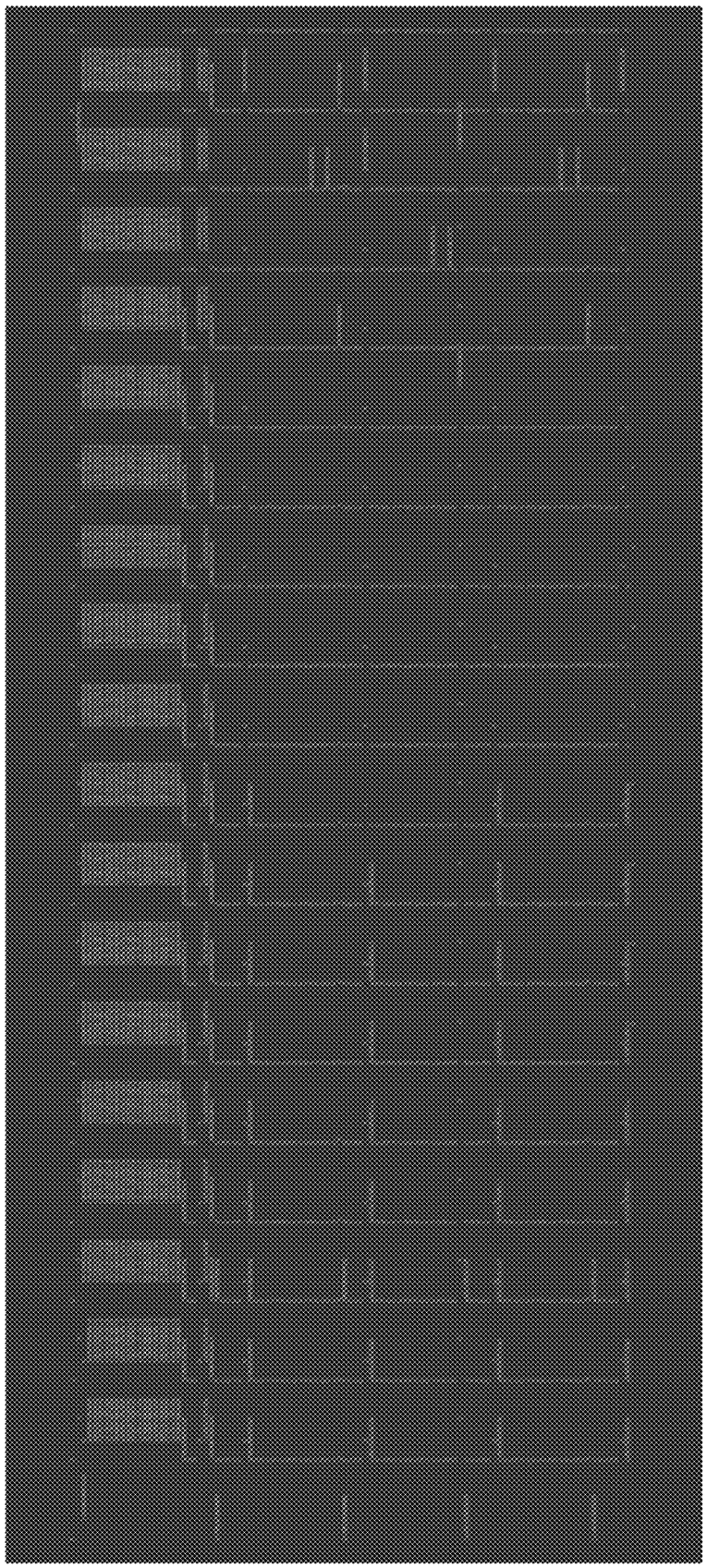
FIG. 3 illustrates how a typical cell map looks in accordance with one or more embodiments of the invention.
Figure 4B:
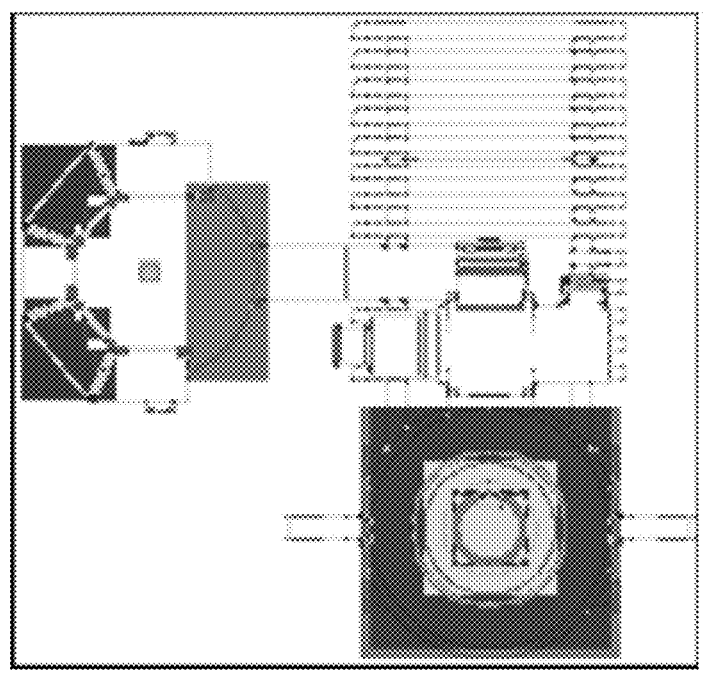
FIGS. 4A and 4B illustrate an exemplary sheet cell map and view cell map in accordance with one or more embodiments of the invention.
Figure 4A:
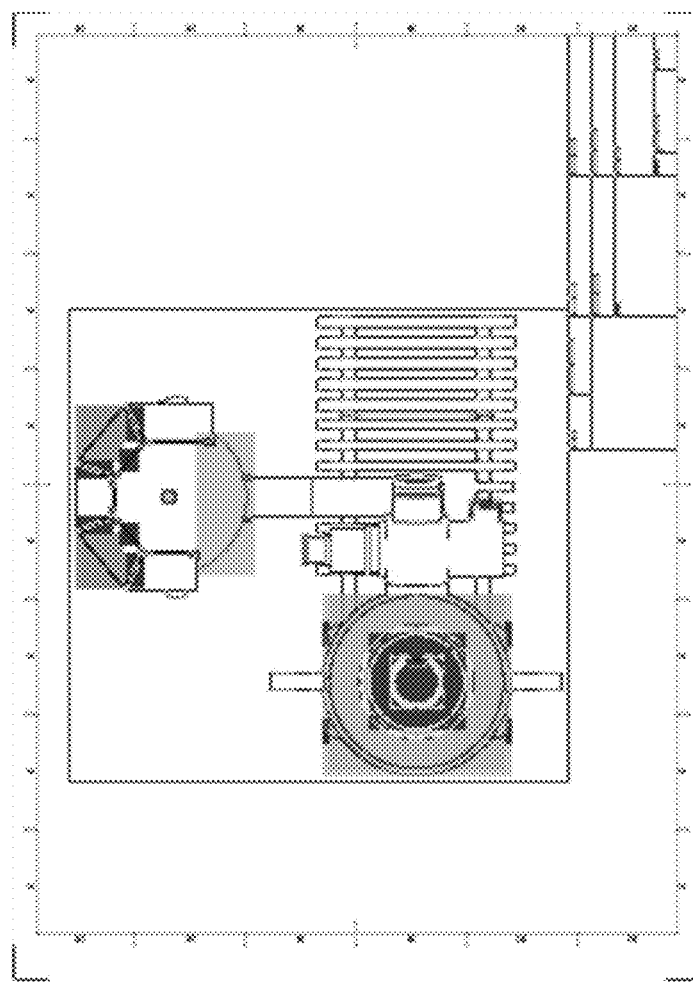

FIG. 3 illustrates how a typical cell map looks in accordance with one or more embodiments of the invention. The cell map contains a plethora of zeros and 64 bit numbers saved in contiguous memory. FIGS. 4A and 4B illustrate an exemplary sheet cell map and view cell map in accordance with one or more embodiments of the invention.

Logical Flow

Figure 5:
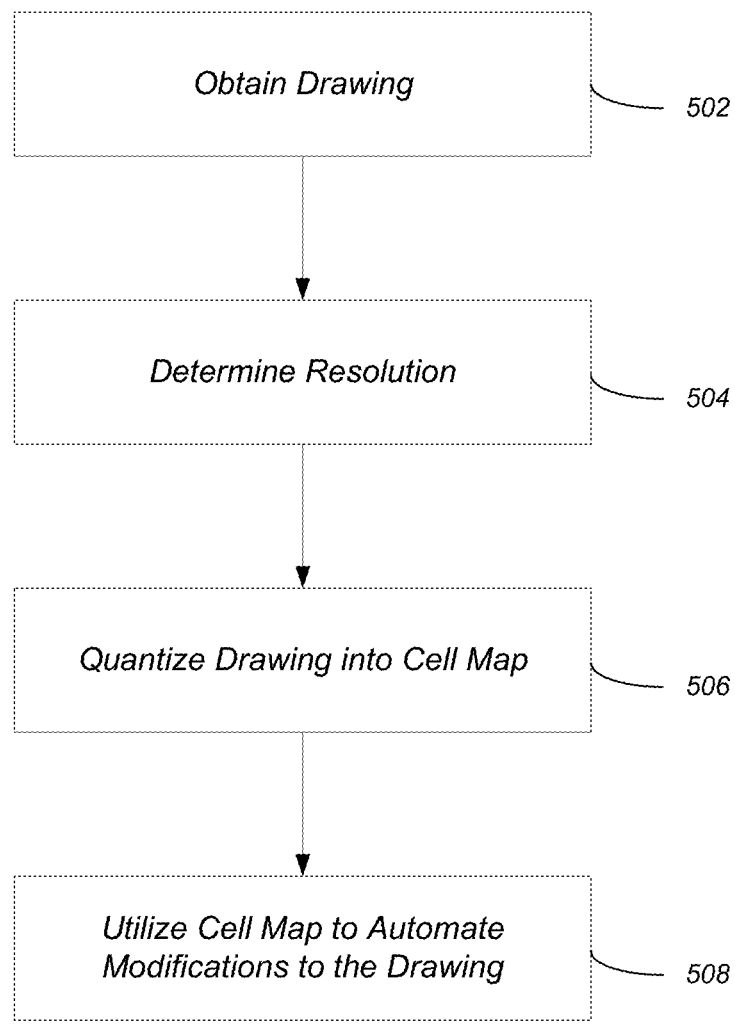
FIG. 5 illustrates the logical flow for automating drawing modifications/drawing workflows in accordance with one or more embodiments of the invention.

FIG. 5 illustrates the logical flow for automating drawing modifications/drawing workflows in accordance with one or more embodiments of the invention.

At step 502, a drawing is obtained and consists of two or more entities.

At step 504, a resolution is determined (e.g., based on paper space).

At step 506, based on the resolution, the drawing is quantized into a cell map. The cell map is a collection of multiple cells stored in a contiguous memory. Each of the multiple cells is quantized geometry data for a corresponding entity of the two or more entities. Each of the multiple cells is a smallest tangible unit of information about the corresponding entity. Each of the multiple cells is a number that represents domain specific information about the corresponding entity. In addition, the quantizing rounds off values beyond a specified threshold to a resolution tolerance of the resolution.

At step 508, the cell map is utilized to automate modifications to the drawing.

Resolution Calculation

Figure 6:
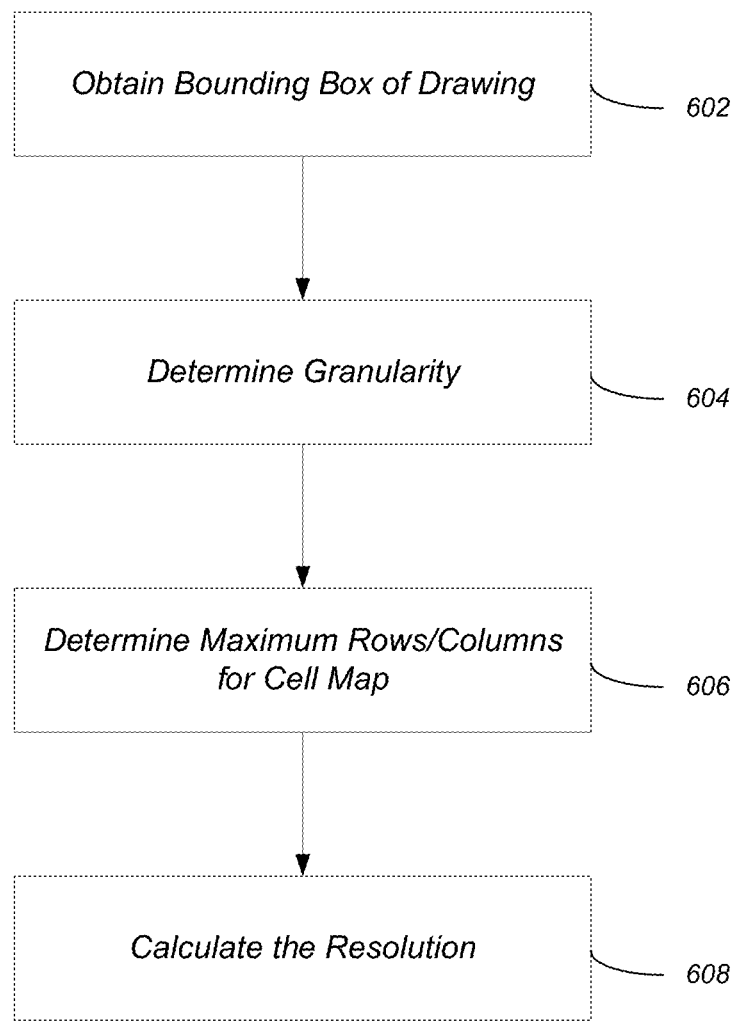
FIG. 6 illustrates the logical flow for calculating the resolution in accordance with one or more embodiments of the invention.

Resolution is an important factor that decides the size of the cell-map. When the cell-map is too huge (which can happen when the resolution is small), the memory consumption increases and the performance degrades. When the cell-map is too small (which can happen when the resolution is large), accurate results may not be acquired. To solve this, embodiments of the invention utilize a method for calculating resolution. FIG. 6 illustrates the logical flow for calculating the resolution in accordance with one or more embodiments of the invention. This method takes in the bounding box of the entity for which the cell-map is going to be created and a CellSize flag. Clients can use the CellSize flag to specify whether they need a fine cell-map or coarse cell-map or an optimal sized cell-map. Thus, at step 602 the bounding box is obtained and at step 604, the level of desired granularity for the cell map is determined/obtained (e.g., via a cell size flag value).

Internally, based on the cell-size flag, embodiments may cap the maximum rows or columns that can be in a cell-map. Accordingly, at step 606, a maximum number of rows or columns for the cell map is determined.

Based on the maximum rows or columns value and the bounding box, the resolution can be back calculated (at step 608) as:

resolution=max(bounding-box-length,bounding-box-width)/maximum-rows-or-columns

In an example, assume that the size of the part is 250 mm×18 mm with the resolution set for the optimal sized cell-map. With a scale of 1:2, the size of the view in the paper space will be 125 mm×9 mm, the number of cells in the cell-map is 512×38 and the resolution can be back-calculated as 0.24. With a scale of 1:1, the size of the view in the paper space will be 250 mm×18 mm, the number of cells in the cell-map is 512×38, and the resolution can be back-calculated as 0.49. If the scale is 2:1, the size of the view in the paper space will be 500 mm×36 mm, the number cells in the cell map is 512×38, and the resolution can be back-calculated as 0.97.

Cell Map Utilization

Once a cell map has been generated (i.e., the geometry has been quantized), there are multiple different ways to automate the drafting/drawing process (i.e., based on/utilizing the cell map [step 508 of FIG. 5]) in a manner that is faster and more efficient than in the prior art. The following description sets forth some of the exemplary automation techniques in accordance with one or more embodiments of the invention.

Auto Break

Figure 7A:
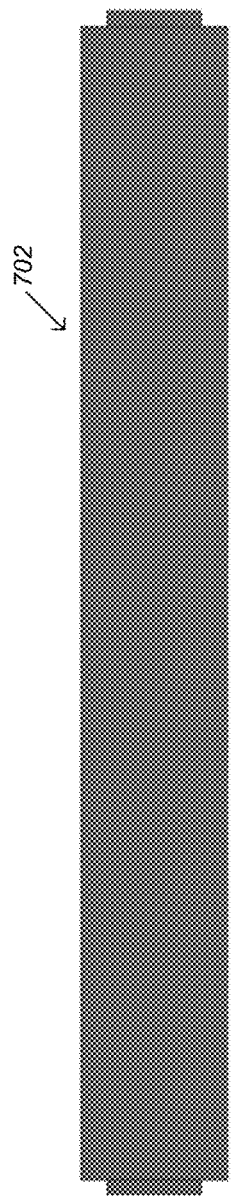
FIGS. 7A-7D illustrate an exemplary flow for automatically breaking a long part in accordance with one or more embodiments of the invention.
Figure 7B:
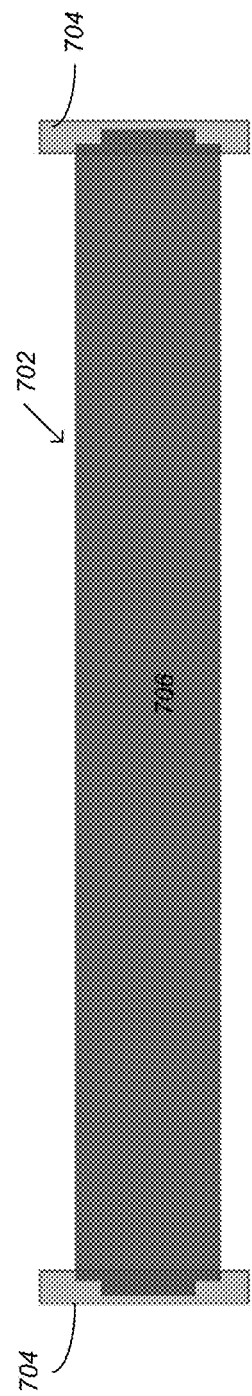

The Auto Break functionality is the ability to find redundancy in a "long part," and break the part if the information redundancy exceeds a defined threshold. FIGS. 7A-7D illustrate an exemplary flow for automatically breaking a long part in accordance with one or more embodiments of the invention. FIG. 7A illustrates an exemplary part 702. FIG. 7B has highlighted 704 the unique features of part 702. The rest of the part 706 has a lot of redundancy. In other words, part 702 has a huge middle section that is entirely empty/with no detail. Important geometry is at the ends of the part 704. In this regard, even if some middle section of the part 702 is removed and the ends are kept intact, the draftsman can still extrapolate the middle information (e.g., the geometry equivalent of a ditto symbol).

Figure 7C:
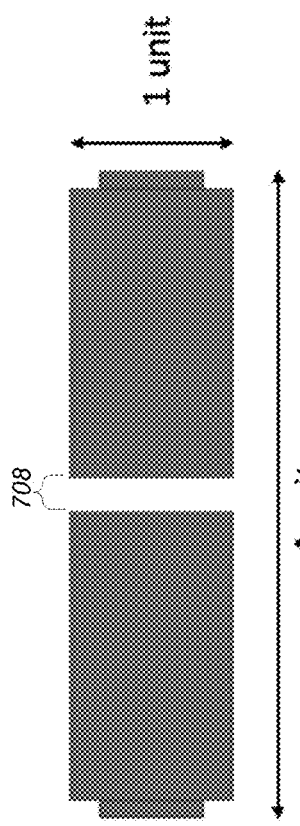
Figure 7D:
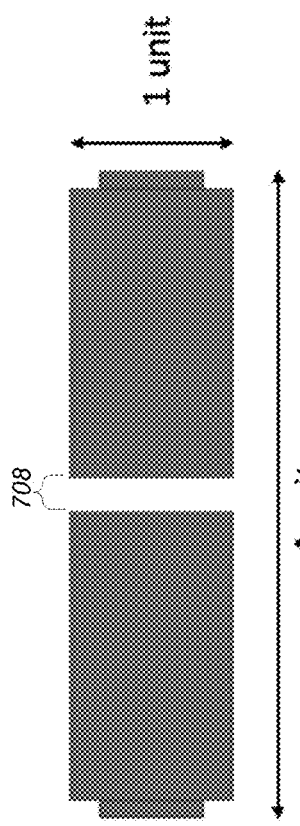

However, it is not desirable to remove all of the redundancy as doing so would result in a part that does not look aesthetically correct. FIG. 7C illustrates an example of how the part may look if all of the redundant information is removed. Accordingly, instead of removing all of the areas that "can be removed" by applying a break, an aspect ratio of the view is maintained so that it looks correct. This aspect ratio is defined in terms of longest-side/shortest-side. For example, if the shortest side of the part is 1 unit, the longest side should be at least maintained at 4 units. Applying the setting to the example of FIG. 7A, FIG. 7D illustrates how the output would look. As illustrated, there is a break 708 in the redundant information of the part 702 while maintaining the aspect ratio of the part.

Figure 8A:
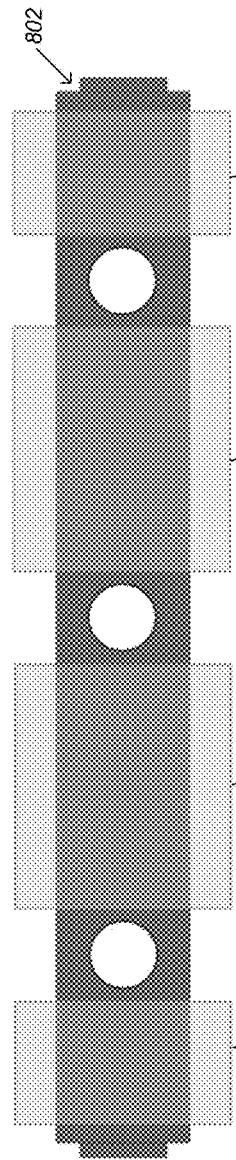
FIGS. 8A-8C illustrate an example of the auto break algorithm in accordance with one or more embodiments of the invention.
Figure 8B:
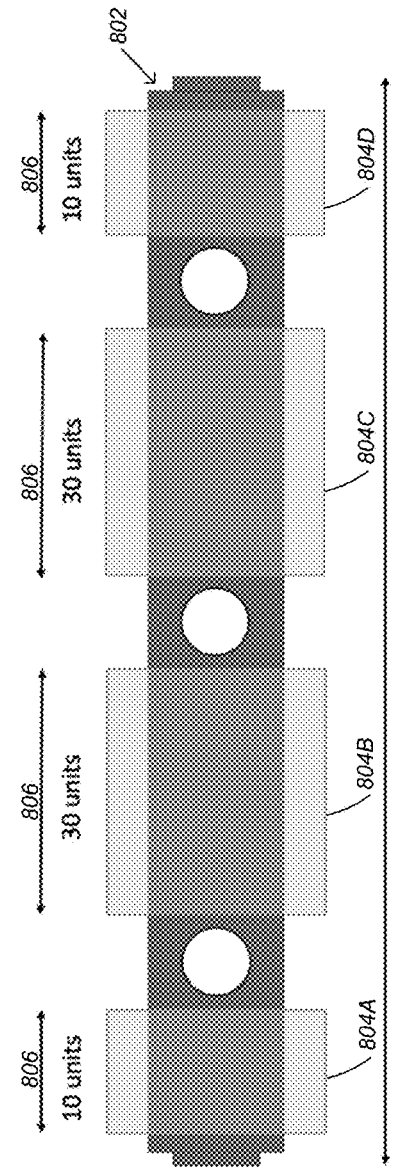
Figure 8C:
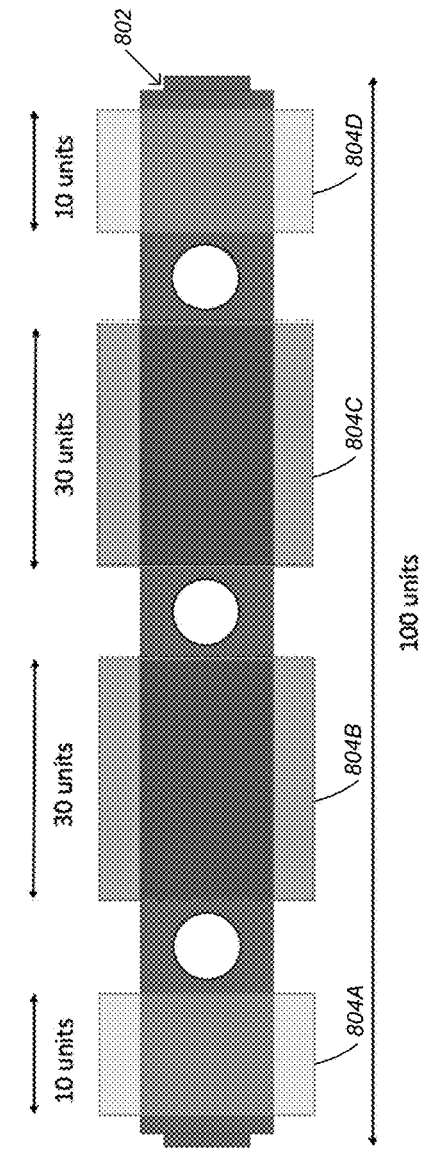

When determining whether to apply a break to a part or not, or how many breaks to apply, embodiments of the invention may attempt to not overuse the break mechanism. For example, a setting may ensure that the total % of a part removed with auto-break is more than a minimum total break percentage. FIGS. 8A-8C illustrate an example of the auto break algorithm in accordance with one or more embodiments of the invention. In FIG. 8A, the highlighted portions 804A-804D (of part 802) are the redundant portions of the part where nothing significant is happening. A setting may define that, the sum of all of the redundant portions 804A-804D should be more than the minimum total break percentage of the part length/width depending on its break direction. This means that the auto break functionality may only be used when there is a significant portion of a part that is redundant.

The minimum total break percentage sets a minimum percentage limit on the total redundancy. However, because of this, there may be some undesirable results if the total extends beyond this minimum but the individual portions are small, which creates too many breaks rendering the entire functionality useless. Embodiments of the invention may prevent such an anomaly by setting a minimum individual break percentage which places a limit on how big the individual redundant portions need to be before the auto break is applied.

In FIG. 8A, the minimum total break percentage is set to 55% and the minimum individual break percentage is set to 25%. The measurements 806 for the different portions of the shape 802 are illustrated in FIG. 8B. As the minimum individual break percentage is set to 25%, embodiments of the invention may only consider the middle 30-unit portions (804B-804C) for breaking and there are two of these 30 unit sections present. The summation goes beyond the minimum total break percentage of 55% and as such, two breaks are applied for these 30% sections 804B-804C. FIG. 8C illustrates the 30 unit sections 804B-804C that the auto break will be applied to while not breaking the 10 unit sections 804A and 804D.

Figure 9:
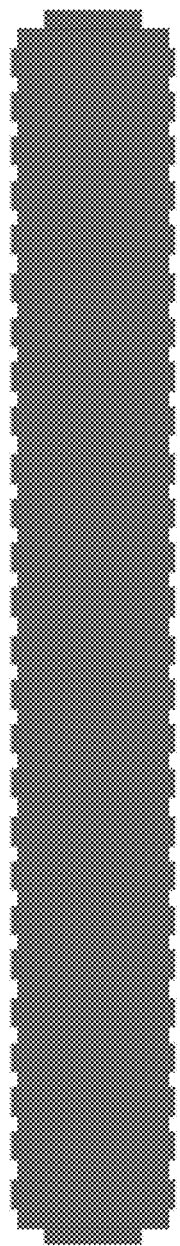
FIG. 9 illustrates an example where the geometry may not be as continuous as in FIG. 7A in accordance with one or more embodiments of the invention.

Further to the above, FIG. 9 illustrates an example where the geometry may not be as continuous as in FIG. 7A. In FIG. 9, the part has repeated sections at continuous intervals, but as a human reading it, the middle section still does not provide any additional information. Relying on geometry information may not be a viable solution in such cases. Further, sometimes, the geometry is not as clean as it should be—e.g., where there are continuous broken edges in between and output may have a tolerance factor. In embodiments of the invention, cell maps may be used to calculate the entropy of a part (which is a measure of randomness in the part's geometry). In this regard, the more the randomness, the less likely the user is going to extrapolate the information. Similarly, the less the randomness, the more likely the part is to be broken. Embodiments of the invention, identify/find the redundancy in the part horizontally (i.e., how much the part is changing geometrically rather than visually as the part is looked at horizontally).

Figure 10:
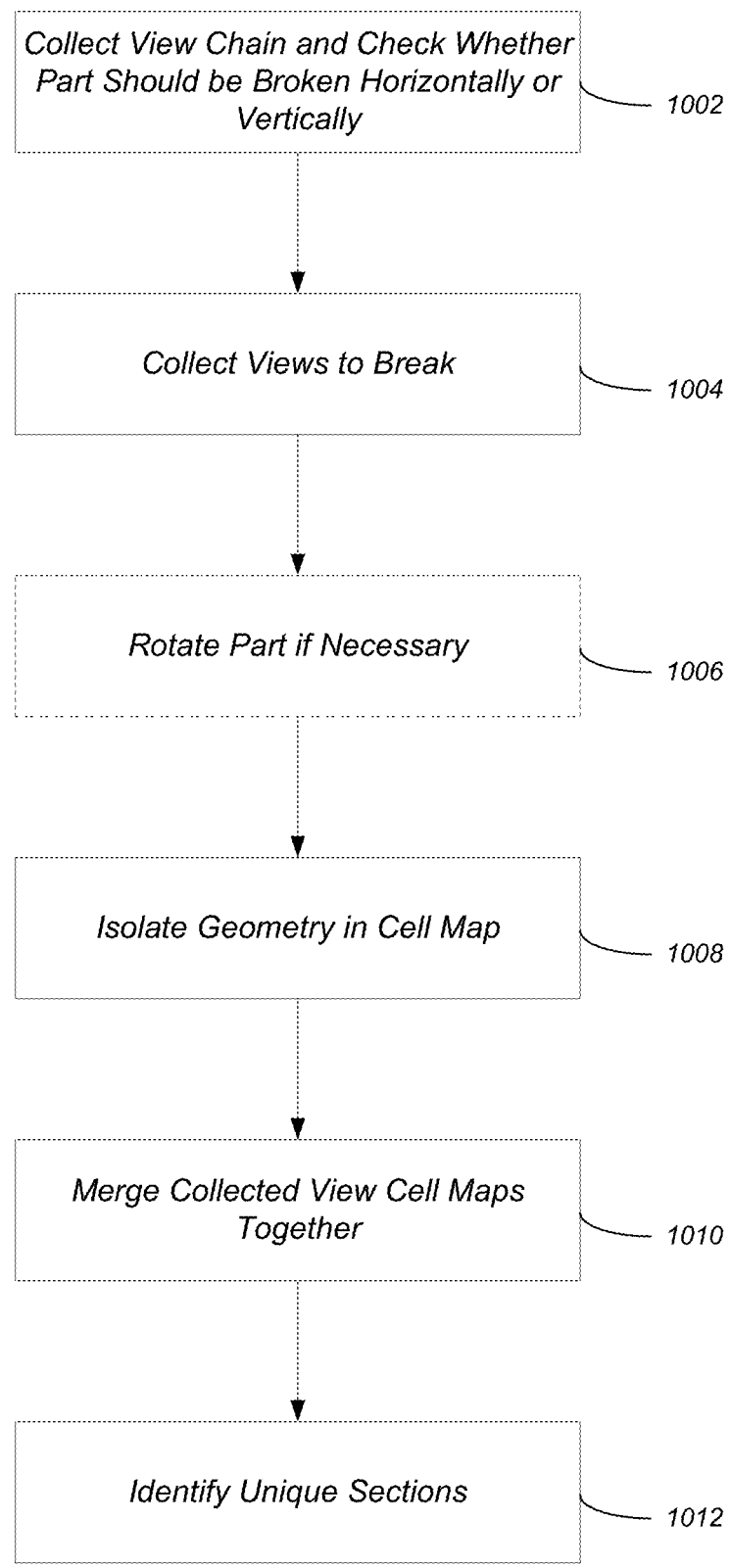
FIG. 10 illustrates the logical flow for utilizing a cell map to automatically break a part in accordance with one or more embodiments of the invention.

FIG. 10 illustrates the logical flow for utilizing a cell map to automatically break a part in accordance with one or more embodiments of the invention. At step 1002, the first step is to collect the view chain and check whether the part needs to be broken horizontally or vertically. View chain is a collection of orthographic views of a part. Typically, view-chain includes a base-view and associated projected views of that base view in other orthographic directions. This may happen as part of a validation itself. In the validation process, the lengths and widths of the views insider view chain are compared—users typically break the longest side of a view. Thus, as a part of validation, the views that have same length or width (whichever is bigger) are clubbed together. If it is found that the part's length to width ratio is less than a specified/defined aspect ratio threshold, the process exits.

At step 1004, views are collected to break. The breaks are inherited from a projected view so embodiments of the invention may look at the projected view (when identifying the breaks) to make sure that anything important in another view is not being removed.

Embodiments of the invention may only compute for vertical breaks. Accordingly, at step 1006, if a part is found that has more height than width, the part may be rotated by 90 degrees.

At step 1008, the geometry is isolated in the cell map. Cell maps contain a lot more information than just geometry. Accordingly, embodiments of the invention may run a mask through the cell map isolating just the geometry components in it.

At step 1010, the collected view cell maps are merged together.

At step 1012, unique sections in the views are identified via the cell map.

The output of the process are the broken view parameters. These parameters define what percentage of parts needs to be removed because of redundancy for the part that is to be broken (e.g., it may also return the parameters of the unique sections in the part).

Figure 11:
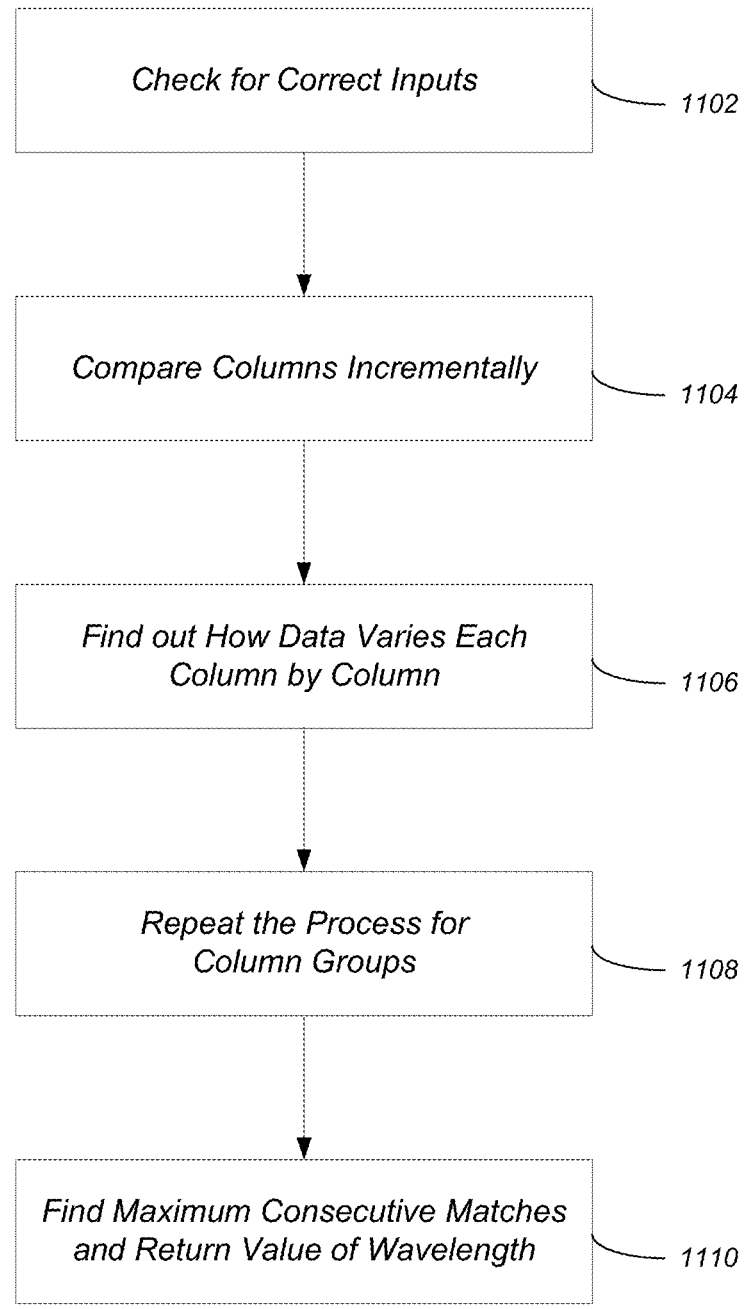
FIG. 11 illustrates the detailed logical flow for identifying the unique sections using the cell map in step 1010 of FIG. 10 in accordance with one or more embodiments of the invention.

FIG. 11 illustrates the detailed logical flow for identifying the unique sections using the cell map in step 1010 of FIG. 10 in accordance with one or more embodiments of the invention.

Before reviewing the details of FIG. 11, it may be useful to provide some background on unique sections of entities/parts. As a human, when we look at any information like images or text or geometry for that matter, we unknowingly filter out the redundancy in that information and just concentrate on the unique value or random value that the information has to convey. A good example of it would be an image that has just all white pixels. This image does not carry a lot of unique information or there is very less randomness in that information. One can say that the entropy of the image is low. For humans on a broad level, one can consider entropy as a measure of information. In geometry as well, if one somehow calculates the entropy, it can give a good sense of interpreting the data. Here are some examples of how finding the entropy of a given geometry can help solve some domain problems:

(1) Finding out where to apply a break: Referring again to FIGS. 7A-7C, consider a long cylindrical part 702 with some protrusion at the ends of it. As a human or a draftsman looking at the part, it becomes apparent that only ends 704 of the have some "geometry information" however a large section 706 in the middle has nothing. If one programmatically identifies that the middle section 706 does not carry any information, a break can be applied to it and readers/viewers of this would be able to extrapolate the information.

(2) Finding out where to put dimensions: Please refer again to FIG. 9 which can be used to demonstrate how finding entropy can help identify where to place dimensions. In FIG. 9, one may easily say that there is a related pattern and no such pattern needs to be dimensioned. If we identify just the unique portion of the part, it can help in identifying where the dimensions need to be placed.

FIG. 11 illustrates the logical such that for a given cell map, the function finds out where information is present within the cell map when traversed horizontally. This is useful in identifying where to put dimensions in addition to determining if a certain part needs to be broken. The input is the cell map and the output is a description of the unique section information.

As the cell map is traversed horizontally, it is traversed incrementally. The process starts by comparing the nth Column to the n+1th Column. Then the process tries with (n) & (n+1)th column with (n+2)&(n+3) column. The process then continues increasing. Thus, the process starts with n to (n+m)th column and compares that bunch with (n+m+1) to (n+m+m) ie (n+2m) columns. In other words, the process starts by comparing the $1^{st}$ and $2^{nd}$ columns and increments up comparing groups of columns (e.g., the first 6 columns with the next 6 columns). As used herein—the "m" value is a constant referred to as the maxWavelengthToTry.

As the comparison is conducted, the system takes into account the inherent approximation that happens once the cell map world is entered. In this regard, embodiments of the invention may sometimes check not just the intended cell, but also the adjacent cell. A tolerance value gives clients a way to modify the value of how many adjacent cells need to be checked. Embodiments of the invention may set a default value of 1, which is moderate checking, where precedence is given to the exact cell, but if that fails, 8 adjacent cells are checked (i.e., three in the above row, three in the below row, and two cells on the side). In this regard, a tolerance level for comparing values in the cell map may be strict (e.g., 0), moderate (e.g., 1), or relaxed (e.g., 2).

At step 1102, the system checks to determine the inputs are correct. More specifically, embodiments confirm that a defined wavelength is correct with respect to the cell map. For example, if −1 (i.e., the defaults value) is the value for maxWavelengthToTry, attempts are made to set the maxWavelengthToTry to the number of columns in the cell map divided by 4. Four (4) is picked because that is the maximum value that could ever be the wavelength of the unique-section, any more than that is logically not possible or useful. A check may also be made to ensure that the tolerance is not too high for smaller cell maps (i.e., confirming that a defined tolerance is correct with respect to the cell map).

At step 1104, the cell map is traversed while comparing columns (up to the maxWaveLengthToTry column). The comparison is based on the defined tolerance (e.g., strict, moderate, or relaxed) to determine a number of consecutive matching values. In this regard, a comparison is made incrementally across the cell map columns from 1-1 columns to maxWavelengthToTry and the results are stored in a data structure count (e.g., Consecutive Count Values). This data structure count stores the values in the form of how many matches it saw consecutively while traversing the columns. In other words, the process finds out how data varies column by column at step 1106.

At step 1108, once all the columns have been processed (one by one), the chunks/groups of columns are checked to see if they are same. The maximum chuck of columns may be defined via a constant value (e.g., maxWavelengthToTry).

Once all such traversals are done the location of the maximum consecutive matches is identified/determined and the final value of the defined wavelength (corresponding to that location) is retrieved and returned at step 1110.

Overlap Detection and Automatic Arrangement

Arranging dimensions is a time-consuming and multi-click operation. Arranging dimensions should also take care of the annotations like hole and thread notes, wield symbols, and notes. Further, when arranging dimensions, the arrangement should take care of overlaps. Embodiments of the invention provide for overlap detection and automatic arrangement which provides the capability to determine where objects overlap with one another and quickly finding a better place for the objects where they don't overlap. Such capabilities may be used to automatically arrange dimensions, hole and thread notes, and/or other annotations. Further, views may be nested on a sheet and scaled up/down if they overlap.

As described above, arranging dimension is more time consuming than actually creating dimensions. Arranging requires a precise drag and a click and repeated moves if another dimension is added that conflicts or just moves the views around. Thus, it is important to automate this task. There are various types of dimensions (also referred to as "dims"): (a) linear dims that can only be moved in vertical or horizontal direction; (b) aligned dims that can be moved in a certain angle; and (c) radial and diametric dims that can be moved in 360 degrees. The goal however for the movement is simple: the dimension should be closer to the entity that it is measuring, it should be compact but as per standard and it should not overlap with any other dimension, annotation or view. Abiding by these simple rules provides an algorithm to arrange the dimensions.

Figure 12:
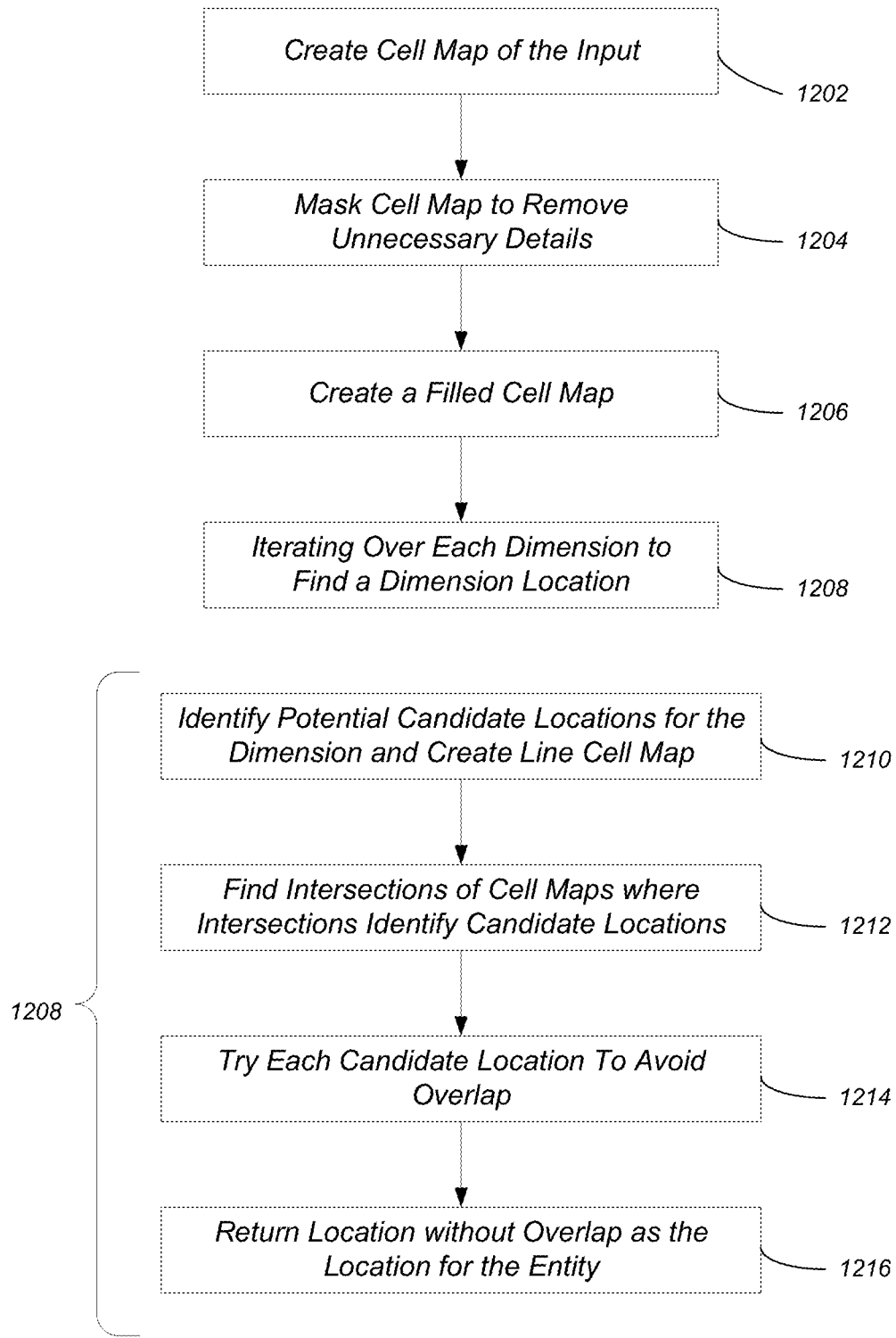
FIG. 12 illustrates the logical flow for automatically arranging entities in accordance with one or more embodiments of the invention.

FIG. 12 illustrates the logical flow for automatically arranging entities in accordance with one or more embodiments of the invention. Inputs include (a) the view whose annotations and dimensions are to be arranged, and (b) the specific associated objects that are to be arranged. The output consists of the arranged dimensions.

At step 1202, the input (i.e., the view in question, the annotations, and dimensions to be arranged) are processed to create a cell map. FIGS. 13A-13G illustrates an exemplary cell map auto arrangement in accordance with one or more embodiments of the invention. More specifically, FIG. 13A illustrates an exemplary cell map 1302 created at step 1202. In other words at step 1202, the cell map 1302 is crated based on a view of the drawing and one or more annotations or dimensions.

At step 1204, the cell map 1302 is masked to remove a set of (unnecessary) details (e.g., that the system does not want to see from it). FIG. 13B illustrates the resulting masked cell map 1304.

As it is not desirable to have dimensions and annotations inside of the view boundary, at step 1206, a filled cell map is created out of the masked cell map 1304 and the filled area is excluded form putting any dimension/annotation in. FIG. 13C illustrates a filled cell map 1306.

At step 1208, the process iterates over each and every dimension to try and find a place for it on the sheet. While iterating, the dimension to be nested is cloned. This way, the dimension cell map is at the location where it is at and the text length required is known. Before the process proceeds to nesting the dimension, a check may be made to determine if the nesting has been overridden for the auto-arranging. Steps 1210-1216 provide the details for the iterating step 1208.

At step 1210, once the dimension to be nested has been identified, the potential candidate locations for the dimension are identified. In addition, in step 1210, a line of the potential points (for the potential candidate locations) is created and called a "line cell map". The line cell map is then superimposed on the view itself. FIG. 13D illustrates the line cell map 1308 superimposed on the view cell map 1310. In other words, at step 1210, a line cell map is created and comprise potential candidate locations for the one or more annotations or dimensions.

Once this is superimposed, step 1212 identifies the intersections of these two cell maps 1308 and 1310. FIG. 13E illustrates these intersections 1312. The cells in the cell map are now candidate locations for the dimension to be placed. The candidate locations are then sorted. In other words, at step 1212, one or more intersections of the line cell map and the filled cell map are determined/identified, wherein the intersections identify a subset of the candidate locations for the one or more annotations or dimensions.

Once these sorted locations are found, step 1214 tries each location (in the subset of sorted locations) to find/identify a candidate location where there isn't any overlap. FIG. 13F illustrates a candidate location 1314 that overlaps with the cell map 1302. In contrast, FIG. 13G illustrates a location where no overlap is found between cell map 1302 and candidate location 1314.

At step 1216, the candidate locations (in the subset) without any overlap are found (e.g., such as that in FIG. 13G) and identified as the location for that entity (i.e., the annotation or dimension) and returned. FIG. 13H illustrates another example of a combined cell map after placement in accordance with one or more embodiments of the invention.

Automatic Nesting

Placing views aesthetically is important for drawings, and most of the user clicks happen to achieve this. Nesting is the process of placing the views on the sheet in a compact way that does not overlap. Automatic Nesting (or Auto-Nest) automates the view placement workflow and tidies up the drawing. However, it may be noted that Auto-Nest may not be useful unless it is paired with auto arrange as described herein because auto-arrange is the process where as a user we get to know how many dimensions are getting created for a drawing view, until we know that, placing the views will not make sense. In this regard, when scaling or nesting, embodiments of the invention provide for an area (i.e., empty space) kept for annotation and dimensions around the view (referred to as padding). The more details that are in a view, the more space that is required and thus, more space to be left around the part/view. Further, some parts may have details on just one side of a part and another side might just be plain. Accordingly, embodiments of the invention dynamically calculate the area around a part looking at the region and looking at the details in that region.

The Auto-Nest algorithm takes all of the base views in the sheet as input. With all of the base views collected in a list, the first order of business is to sort these views according to the area they need. Here, embodiments of the invention consider the entire area of the view-chain (i.e., base view along with its orthographic views). In this regard, when dealing with model views, they usually come in as a bunch (i.e., base view+its projected views). Embodiments of the invention may maintain the relative position of the model views from one another. Accordingly, views are not nested. Instead, view-chains are nested.

Once all of the base views are sorted, the first base view is selected and the others in the list may be ignored and/or removed from the sheet itself. For the selected base view, the Auto-Nest operation begins. All the child views from the base view are collected and the process begins generating the cell maps. At the same time, the cell map for the sheet is collected. For the first view the sheet cell map will be empty.

Figure 14:
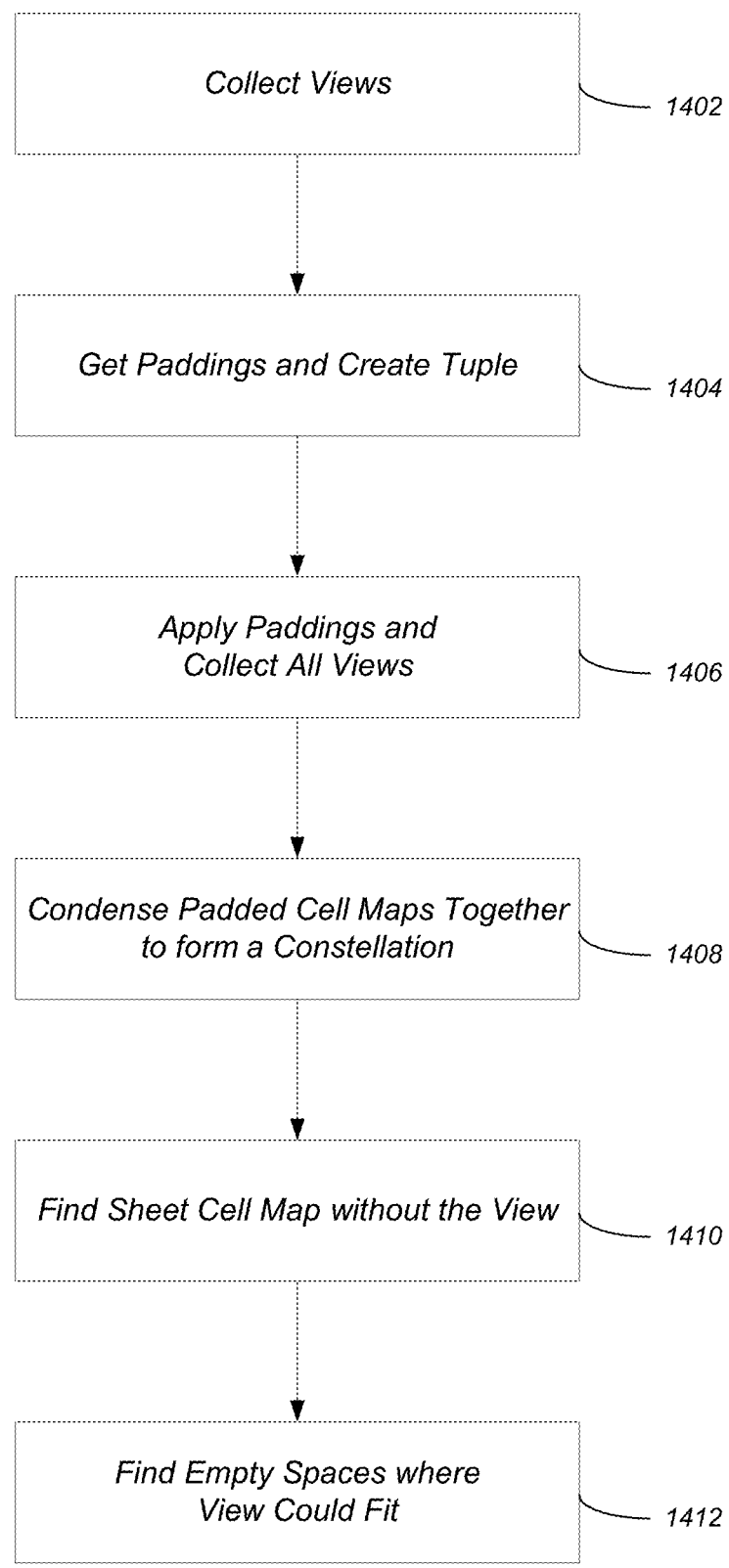
FIG. 14 illustrates the logical flow for the auto nest operation in accordance with one or more embodiments of the invention.

FIG. 14 illustrates the logical flow for the auto nest operation in accordance with one or more embodiments of the invention.

Figure 15A:
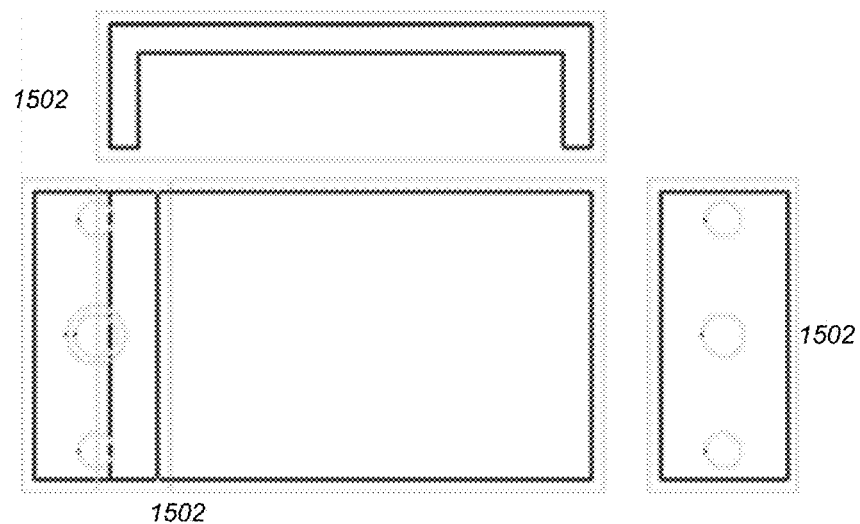
FIGS. 15A-15F illustrate an exemplary auto nest operation in accordance with one or more embodiments of the invention.
Figure 15B:
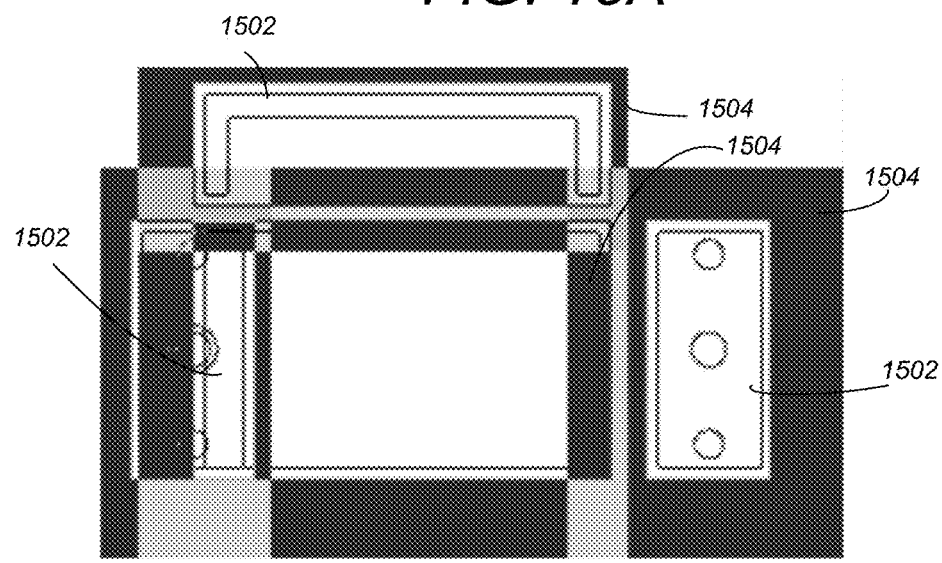

At step 1402, one or more views are collected from the drawing. FIGS. 15A-15B illustrate an exemplary auto nest operation in accordance with one or more embodiments of the invention. More specifically, FIG. 15A illustrates the different views 1502 that are collected.

At step 1404, paddings for the one or more views are determined/computed and a tuple is created. Depending on the setting, the padding may be computed for the view and stored in a data structure. As used herein, a "padding" defines a measure of how much distance is desired between two views.

At step 1406, depending on where the view is, the paddings are applied to the view's cellmap. In this regard, all of the views that are vertical and horizontal are collected (e.g., the top, front, and bottom view are collected). Right front and left view may be collected into separate lists. Depending on the maximum padding, the same padding may be generated across all of the views. Step 1404 outputs a combined cell map (i.e., a combination of the padded cell maps) which is a good way of visualizing the nesting. FIG. 15B illustrates the padding 1504 that has been generated for all of the collected views 1502.

Figure 15C:
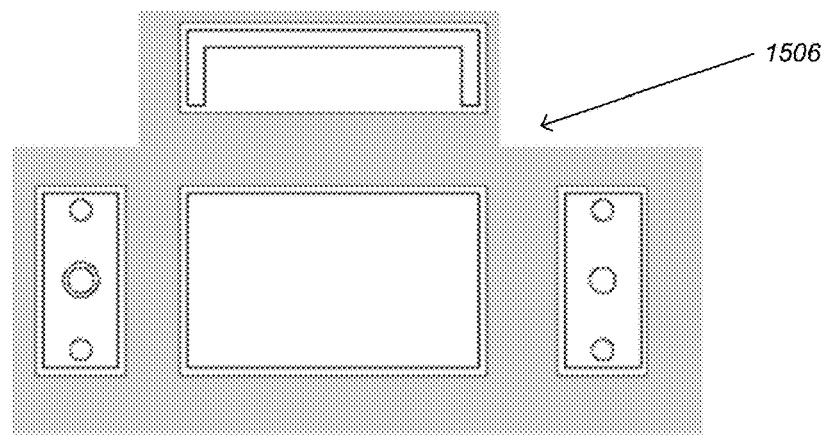

At step 1406, the padded cell maps are merged/condensed/squished together to form a constellation (also referred to as a merged padded cell map). The function to merge the cell maps together takes a base view as input and makes other views latch onto the sides of it. FIG. 15C illustrates a merged cell map 1506 in accordance with one or more embodiments of the invention.

Figure 15D:
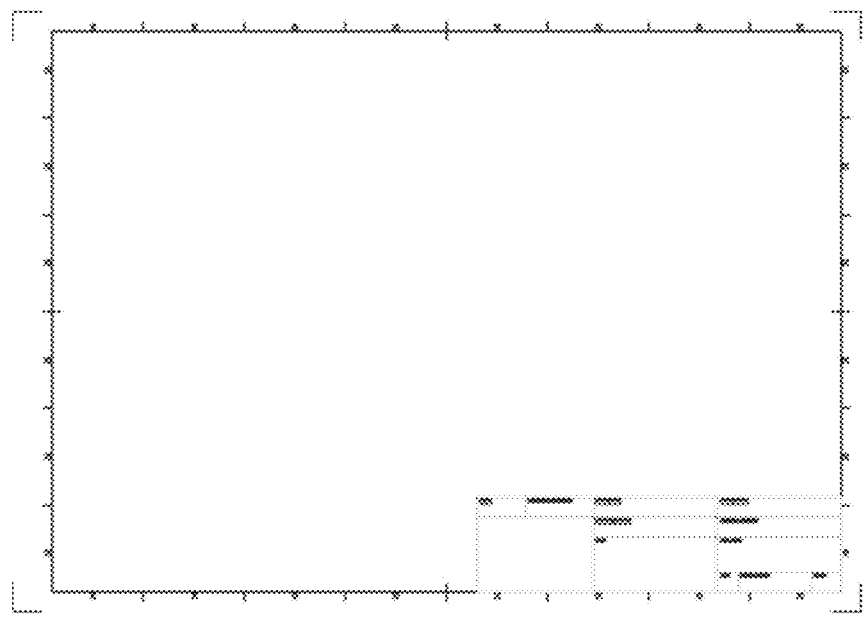

At step 1408, a sheet cell map without the (one or more) views is identified/found. FIG. 15D illustrates how a sheet looks without views.

Figure 15E:
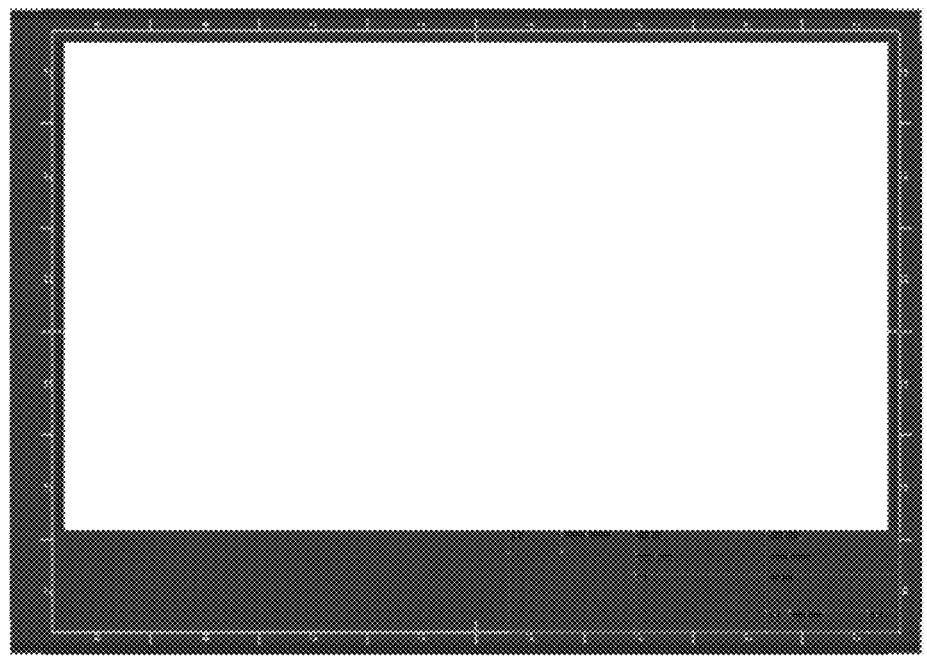
Figure 15F:
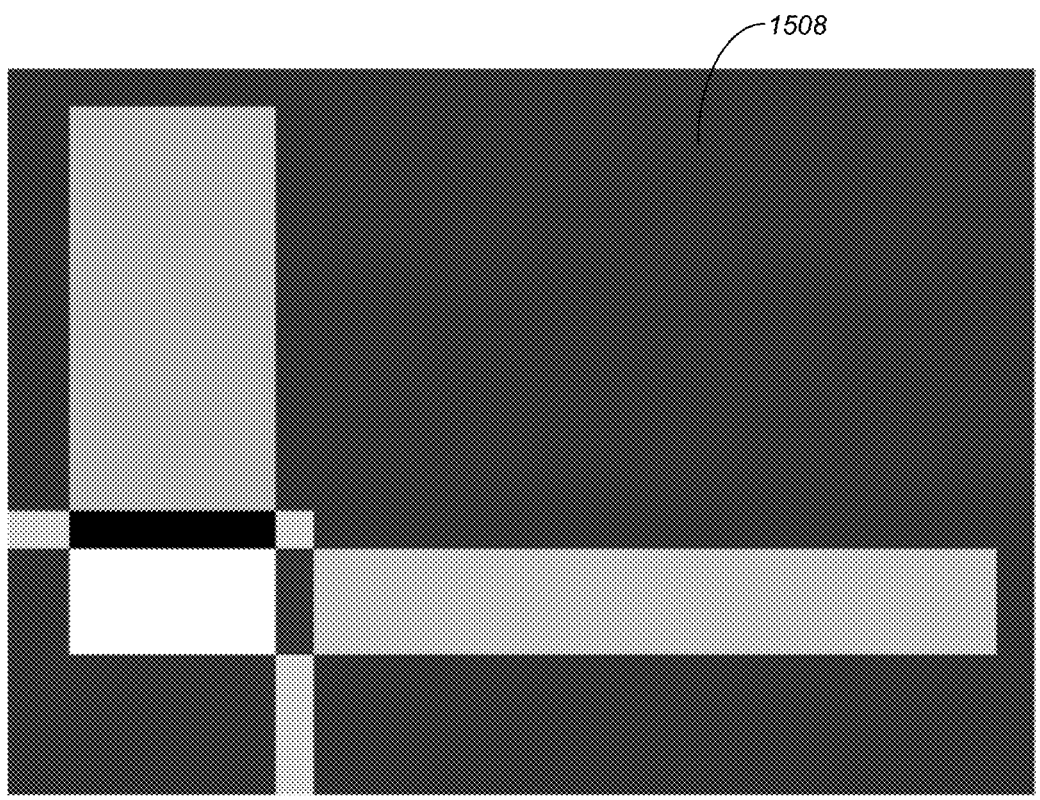

At step 1410, empty spaces in the sheet cell map where the merged padded cell map/view fits (without overlapping anything) are identified/found. In one or more embodiments, white space within a sheet cell map may be used to identify where the cell map can fit that won't overlap with anything. FIG. 15E illustrates a total empty sheet that may be used to nest padded cell maps. FIG. 15F illustrates possible locations 1508 where the views can be nested in accordance with one or more embodiments of the invention.

Automatic Views, Dimensioning Algorithms and Finding Unique Sections, Loops, Symmetry, and Intersections Automatic views enable the ability to determine if two views are fungible in nature, and if so, only keeps one of the views. The dimensioning algorithms enable the auto-dimensioning (described above). In one or more embodiments, the dimensioning algorithms provide for the cell map exploding loops and starting dimensions per loop instead of over an entire view. Further, symmetry in the loops can be identified to reduce dimensions for symmetric geometry. In addition, a drawing view may be overlaid on top of another drawing view of the same component in order to identify if the geometry is identical. Once distinct (non-identical) geometry is identified, dimensioning may be limited to the Boolean intersection of the view.

Automatic Views

In a template-based workflow, which views need to be stamped for a particular component are defined. However, this is not efficient considering that it is not known before hand how many views are required for a certain component. Auto View functionality solves this problem by automatically figuring out which views are needed.

Figure 16A:
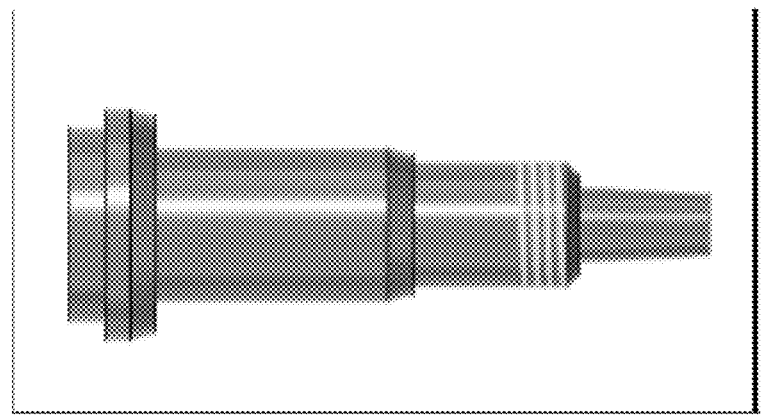
FIG. 16A illustrates a part and FIG. 16B illustrates the views that are generated by the part for automatic views in accordance with one or more embodiments of the invention.
Figure 16B:
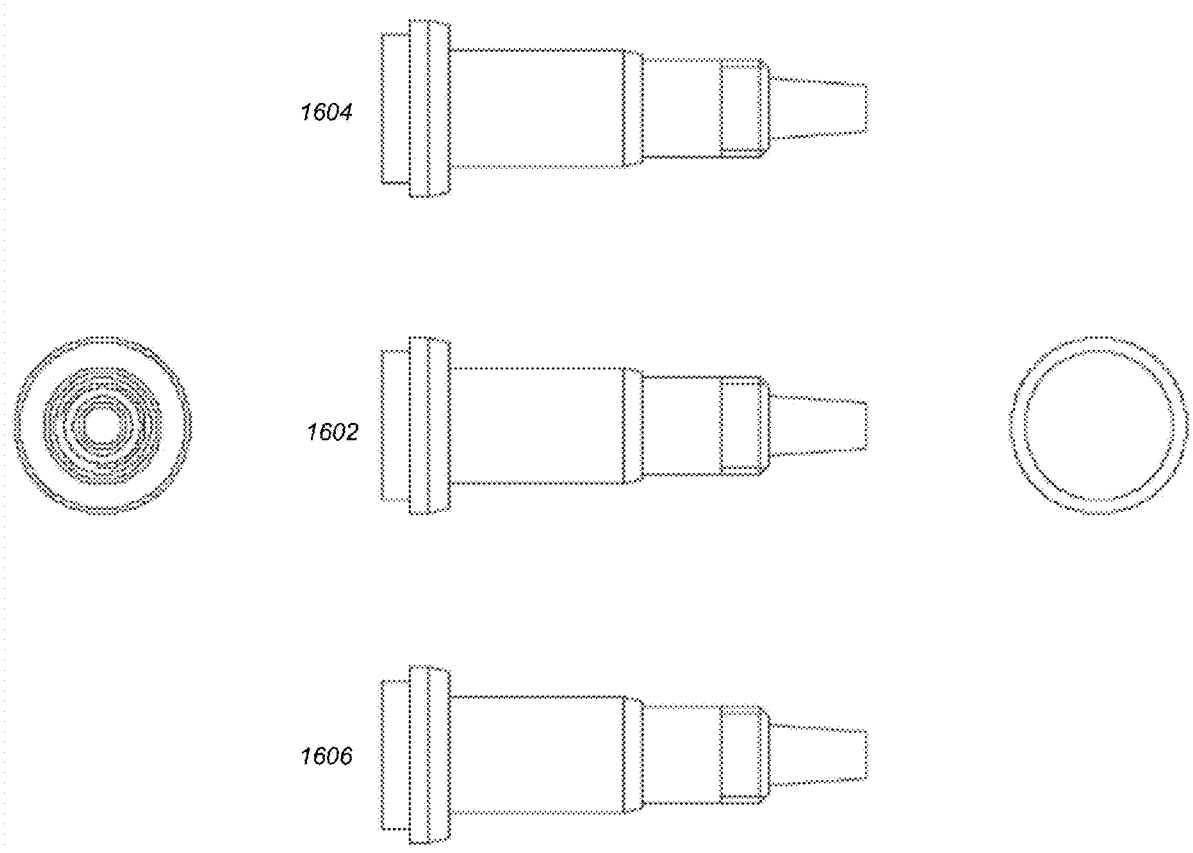

As an example, FIG. 16A illustrates a part and FIG. 16B illustrates the views that are generated by the part for automatic views in accordance with one or more embodiments of the invention. The middle view 1602 is the base view. In this example, the base view 1602, top view 1604, and bottom view 1606 all have the exact same representation. In other words, to the reader of the drawing, these three views 1602-1606 provide the exact same information. Accordingly, these views are referred to as "fungible" in nature, underlying the fact that, to the reader of the drawing, any of these three views will provide the same amount of information. As a convention in drawing, one only needs to keep one of the three views 1602-1606 and still the component will be fully documented. Embodiments of the invention utilizes cell maps to quickly identify if two views are fungible in nature, and if so, only keeps one of such views. In view of the above, auto views finds out Top 1604 and Bottom 1606 are fungible with the Front view 1602, making the Top 1604 and Bottom 1606 redundant.

Figure 17:
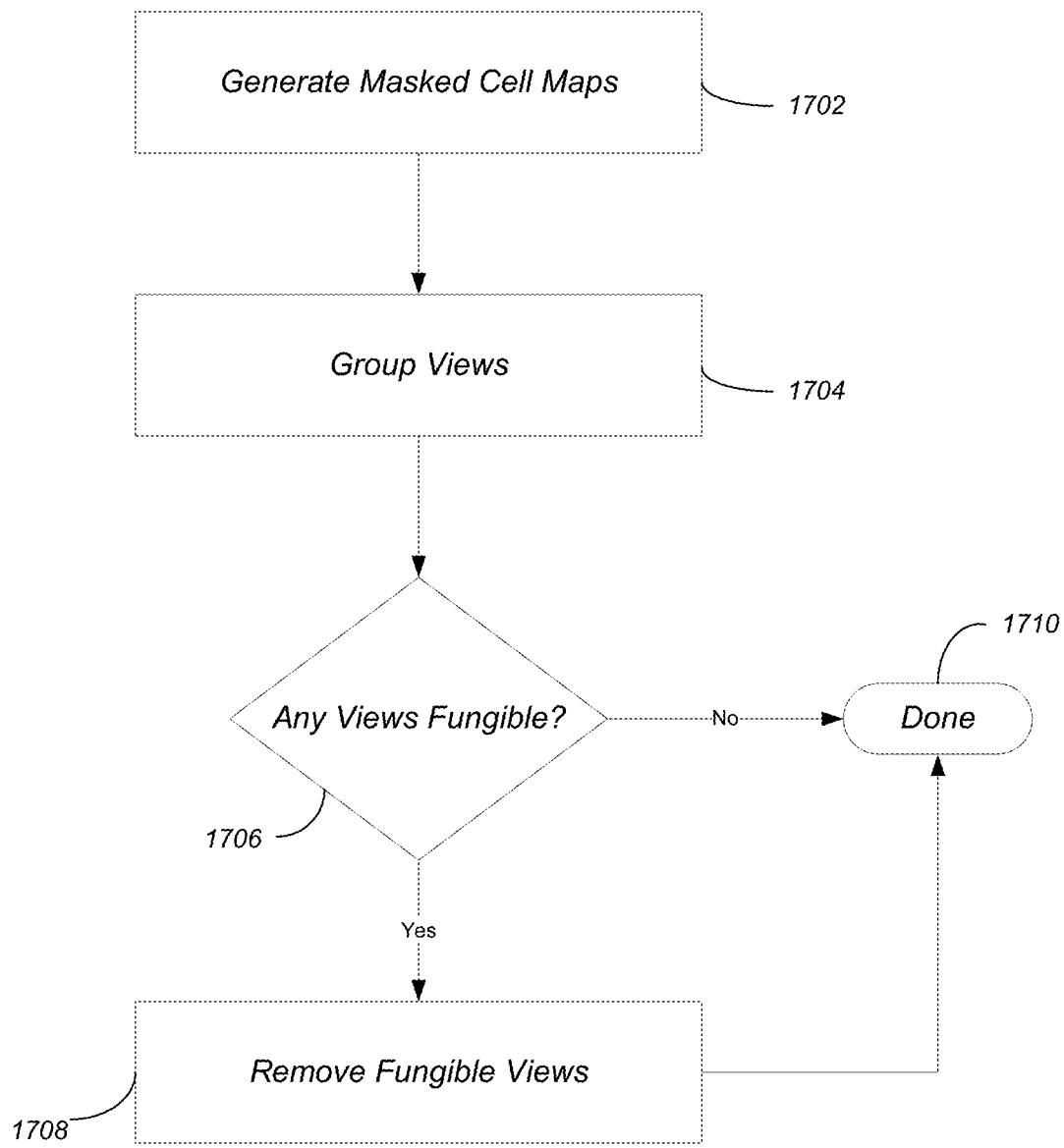
FIG. 17 illustrates the logical flow for the auto view algorithm in accordance with one or more embodiments of the invention.

The auto view algorithm runs on already-created views and takes two views as inputs—a base view and a projected view array. FIG. 17 illustrates the logical flow for the auto view algorithm in accordance with one or more embodiments of the invention. At step 1702, masked cell maps are generated (e.g., based on client settings).

At step 1704, the views are grouped in horizontal and vertical groups. The base view is made common to both of the groups.

At step 1706, a check is conducted to determine if any of the view representations in each group are fungible and can be removed.

At step 1708, any views that are identified as fungible are removed. The process is complete at step 1710.

Figure 18:
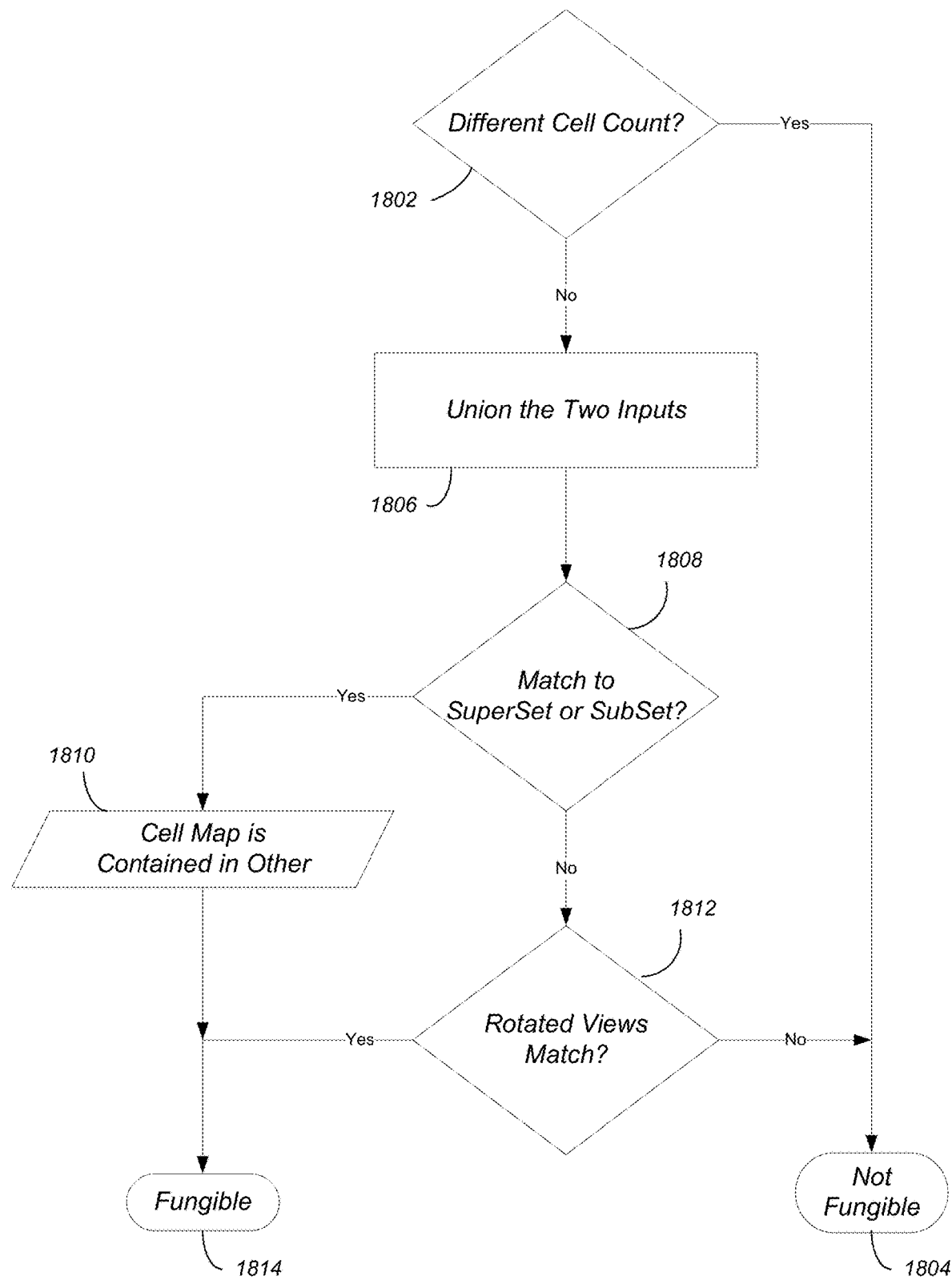
FIG. 18 illustrates the logical flow for determining if any of the view representations are fungible in accordance with one or more embodiments of the invention.

FIG. 18 illustrates the logical flow for determining if any of the view representations are fungible (i.e., provides the details for step 1706 of FIG. 17).

At step 1802, the cell maps are compared to see if they have a different cell count. If they have a different cell count, then they are not the same—i.e., they are not fungible and the process exits early at step 1804.

If the cell count is the same, a union of the two inputs is conducted at step 1806.

At step 1808, a determination is made if the union matches a superset or a subset. As used herein, the superset and subset are the two input cell maps.

If there is a match, then it is like one cell map is contained in another as indicated at step 1810.

If there is no match, then rotated versions of the input cell maps are compared at step 1812 to see if they match. In other words, a horizontally mirrored version and vertically mirrored versions are compared. In addition, step 1810 may include checking if two cell maps match with 90 degree rotated versions of one another. If no matches are found the views are not fungible as indicated at step 1804. If matches are found the views are determined to be fungible at 1814.

Figure 19:
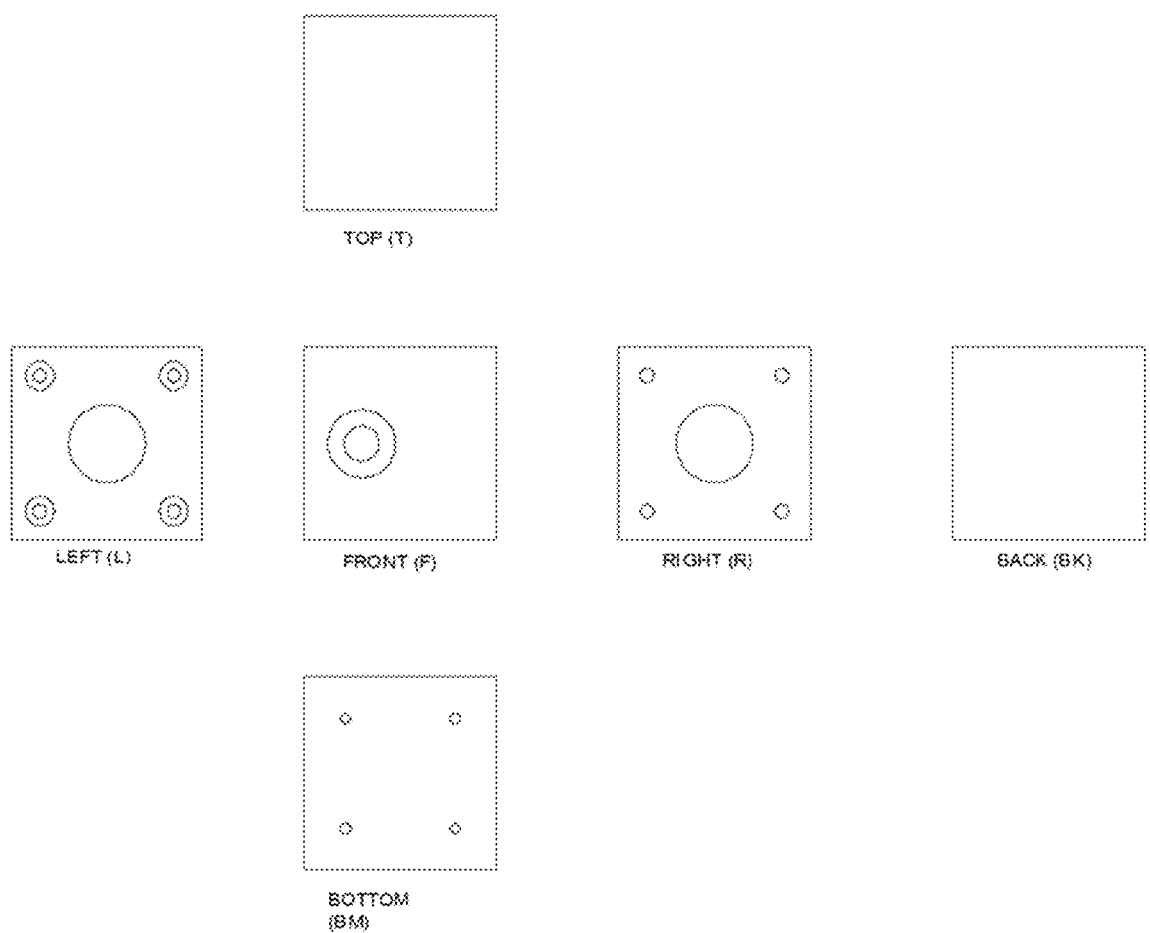
FIG. 19 graphically illustrates the comparison conducted for automatic views in accordance with one or more embodiments of the invention.

FIG. 19 graphically illustrates the comparison conducted for automatic views in accordance with one or more embodiments of the invention. More specifically, FIG. 19 illustrates the placeholder views that are being compared. IF the left and right views are the same, then both the views are considered to be fungible in nature—i.e., they both provide the same information to the user who is reading the drawing. If the left view contains all of the visual structure in the right view, OR the right view contains all of the visible structure of the left view, then the view that contains the other one is considered to have all of the information that is on the other side of the view. Accordingly, it is possible to remove the view with less geometry. Further, as described above, the auto view does not just check for equality of the input views, it may also check the equality of the mirrored versions of the views. The same checks happen for the top and bottom views.

In addition, auto views does one more level of checking. In particular, with the front view, it checks if the winner (that view that is not removed) OR both views (where neither view is removed) from the left view and the right view are fungible with the front view or the mirrored version of the front view. In such cases where fungibility is found, the left or right view may be removed giving priority to the front view. In one or more embodiments, auto view never removes the front view considering that view to be the base view which means all other views are referring to that view (i.e., it tries to maintain the view chain intact).

Autocut Views (Detail and Section Views)

With auto views, orthographic views can be identified and generated. However, for some parts, orthographic views alone are insufficient to fully define a part. In particular, a detailed view and/or section may be needed. Embodiments of the invention identify if a detailed view is needed and where it should be placed. The general idea is that if a part has a lot of entities squished together in a small area, it should require a detailed view as an orthographic view of the entire part may make these details hard to dimension. A default minimum dimension length may be used to identify which length should be considered "small". To identify the need of detailed view, embodiments of the invention may use HeatMaps. Heatmaps are generated while the cellmap is generated and are embedded inside the cellmap. The first four (4) values of a cell encodes this. A heatmap is a measure of how many times a certain cell has been hit with distinct information. As an example, if the same cell contains an end point of a line and a start point of an arc, the cell has heat count of 2. Similarly if there is another edge close to it with the distance less than the resolution, it may also contribute in increasing the heat-count. If in the view, it is observed that a lot of nearby cells have higher-heat maps, then it means that there is a concentration of information in that small area. Such a concentration suggests the need for a detailed view. Further, one or more embodiments may determine that a section view is needed if a part is circular and turned and symmetric.

Figure 20:
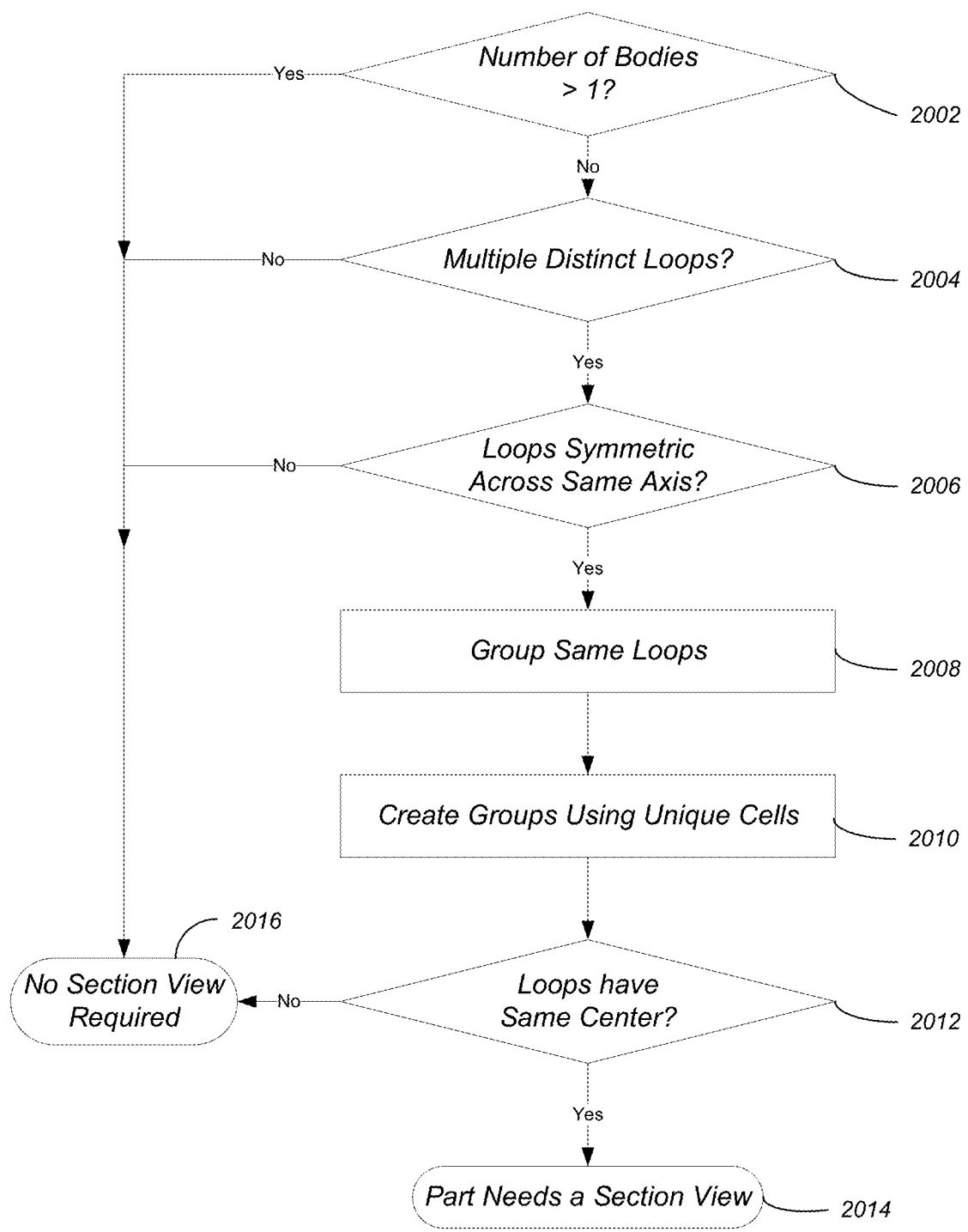
FIG. 20 illustrates the logical flow for generate autocut views (details and section views) in accordance with one or more embodiments of the invention.

The input for a section view algorithm are the view identifications (IDs) and the output is the sectioned views. FIG. 20 illustrates the logical flow for generate autocut views (details and section views) in accordance with one or more embodiments of the invention.

At step 2002, it is determined if the number of bodies is greater than one (1) (i.e., the number of bodies should be just one). In other words, the algorithm identifies one body in the drawing.

At step 2004, a determination is made whether the cell map has at least two distinct loops. In this regard, the cell map should have multiple loops considering that if there is just one single loop, the section view will not show anything the users don't already know.

At step 2006, a determination is made regarding whether the loops are symmetric across the same axis.

At step 2008, the same x-horizontally symmetric loops are grouped together and the same y-vertically symmetric loops are grouped together.

At step 2010, groups are created using unique cells of the cell map.

At step 2012, a determination is made regarding whether the loops have the same center.

If the loops have the same center (i.e., they are concentric), the part is identified as a turned component and needs a section view at step 2014. If the various determinations fail, no section view is required as set forth at step 2016. In one or more embodiments, the process learns from a user's previous data whether a user desires to use a detailed view and/or whether squished details are important/not important to them. Accordingly, embodiments of the invention may utilize machine learning to identify over time whether or not to generate a section and/or a detailed view.

Cell Map Based Loop Generator Algorithm

Figure 21A:
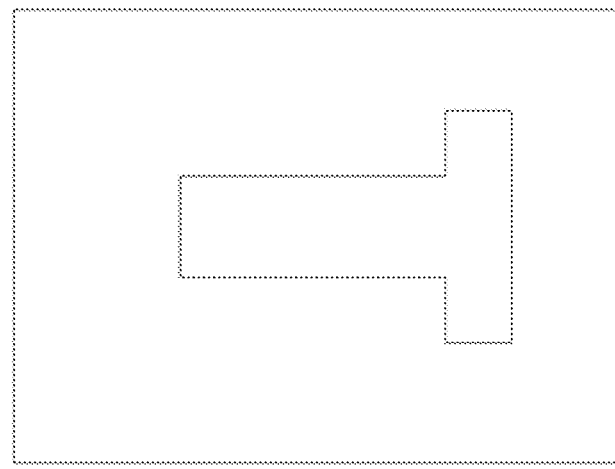
FIGS. 21A-21C provide a graphical example of a cell map based loop generation in accordance with one or more embodiments of the invention.
Figure 21B:
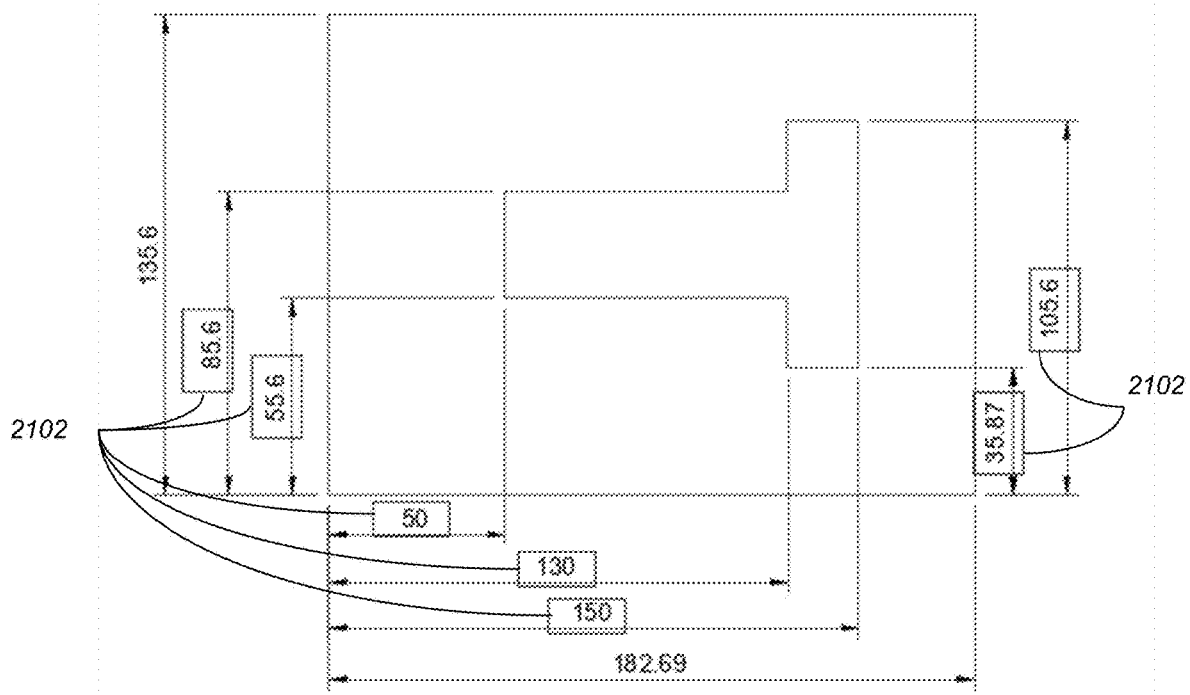
Figure 21C:
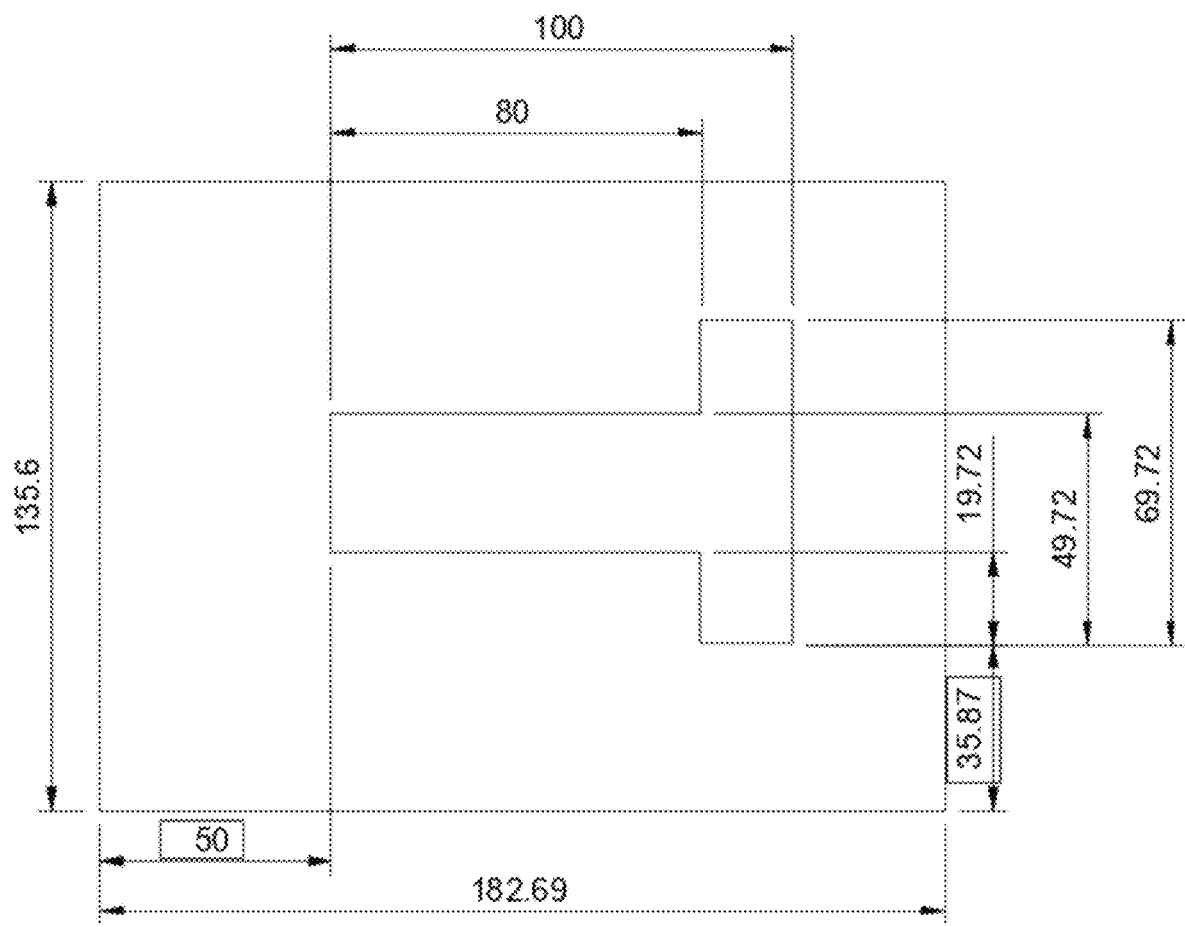

Step 2004 determines whether there are multiple distinct loops. In this regard, embodiments of the invention must first identify loops in a drawing (e.g., so that the dimension generator algorithms can generate dimensions per loop). The loop detection is especially useful for point based dimension generation algorithms (e.g., horizontal/vertical chain/baseline dimensions). Loop detection avoids the number of dimensions between the loops. This section provides an algorithm for detecting loops. FIGS. 21A-21C provide a graphical example of a cell map based loop generation in accordance with one or more embodiments of the invention.

As an example, take a part such as that illustrated in FIG. 21A. If there is no loop detection, then the horizontal and vertical baseline dimension generator algorithm (described below) will generate dimensions like that illustrated in FIG. 21B. In FIG. 21B, all of the dimensions in boxes 2102 are inter-loop dimensions (i.e., they are going from outer-loop to inner-loop). If the loops can be detected and dimensioned separately, the results would look as that illustrated in FIG. 21C with just two inter-loop dimensions (which is needed to specify the position of the inner-loop within the outer-loop).

Figure 22:
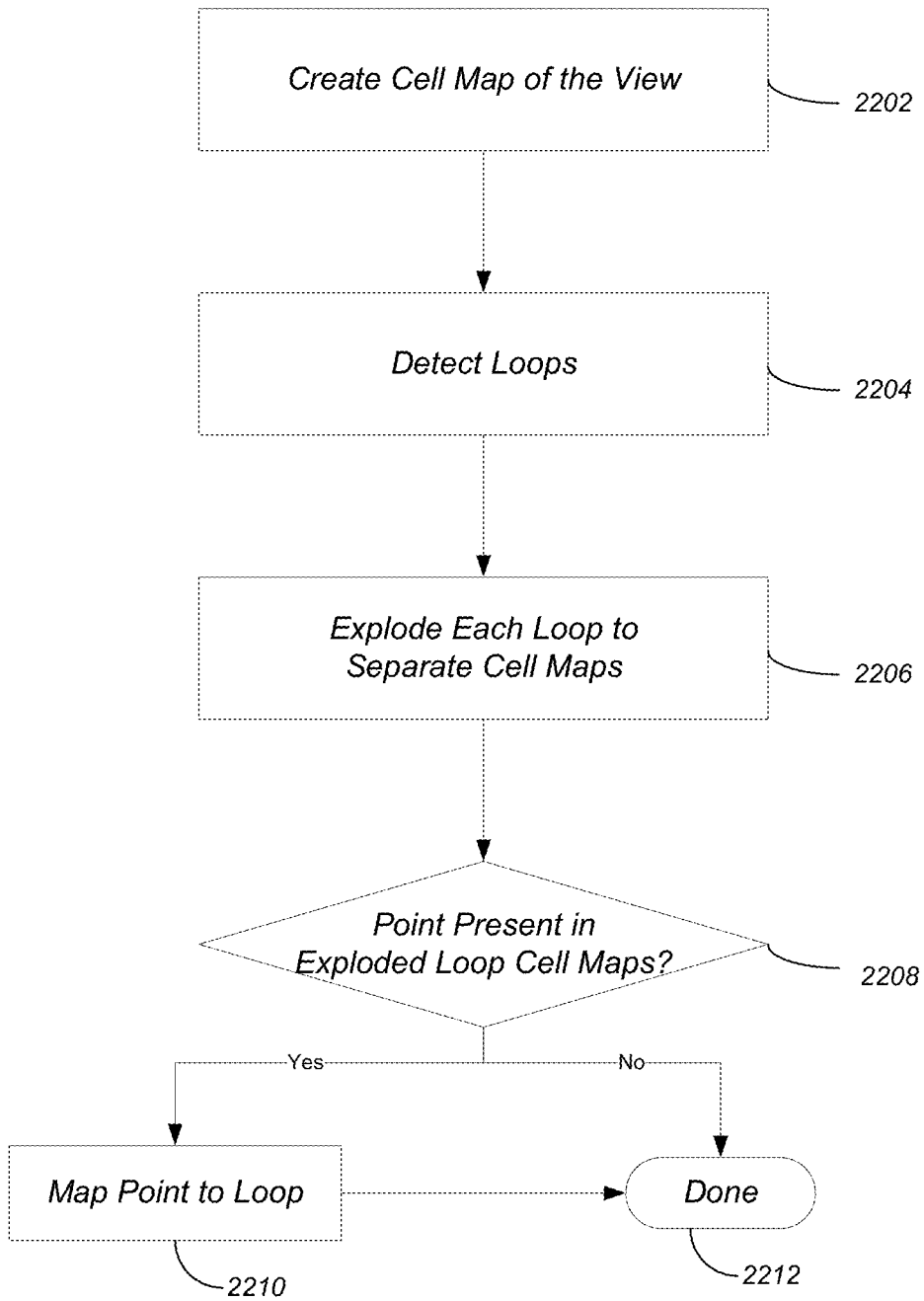
FIG. 22 illustrates the logical flow for using cell map technology to detect loops in accordance with one or more embodiments of the invention.

FIG. 22 illustrates the logical flow for using cell map technology to detect loops in accordance with one or more embodiments of the invention. At step 2202, a cell map is created of a view of the drawing. At step 2204, based on the cell map, one or more loops of the view are detected. At step 2206, each loop is exploded to separate the cell map. At step 2208, each non fungible dimension point in the view is checked to determine if it is present in any of the exploded one or more loops. If it is present, the present point is mapped to the loop (in which it is present) at step 2210 and the process is complete at step 2212.

Same Loop Checker Algorithm

Figure 23A:
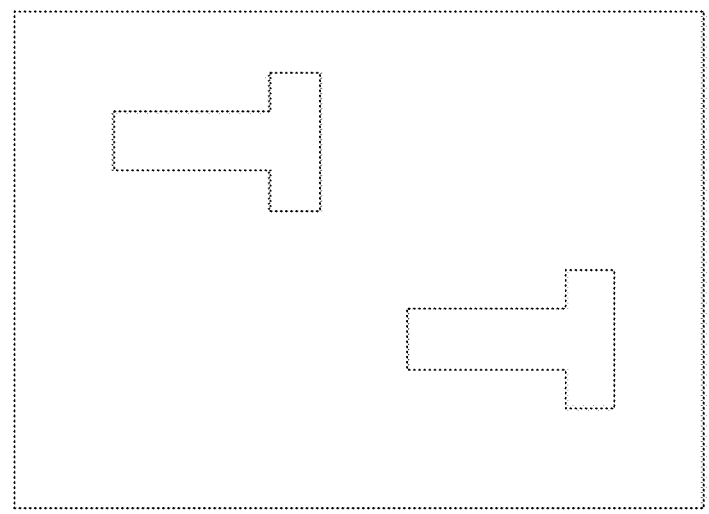
FIGS. 23A-23C illustrate a graphical example of a same loop check that is performed in accordance with one or more embodiments of the invention.
Figure 23B:
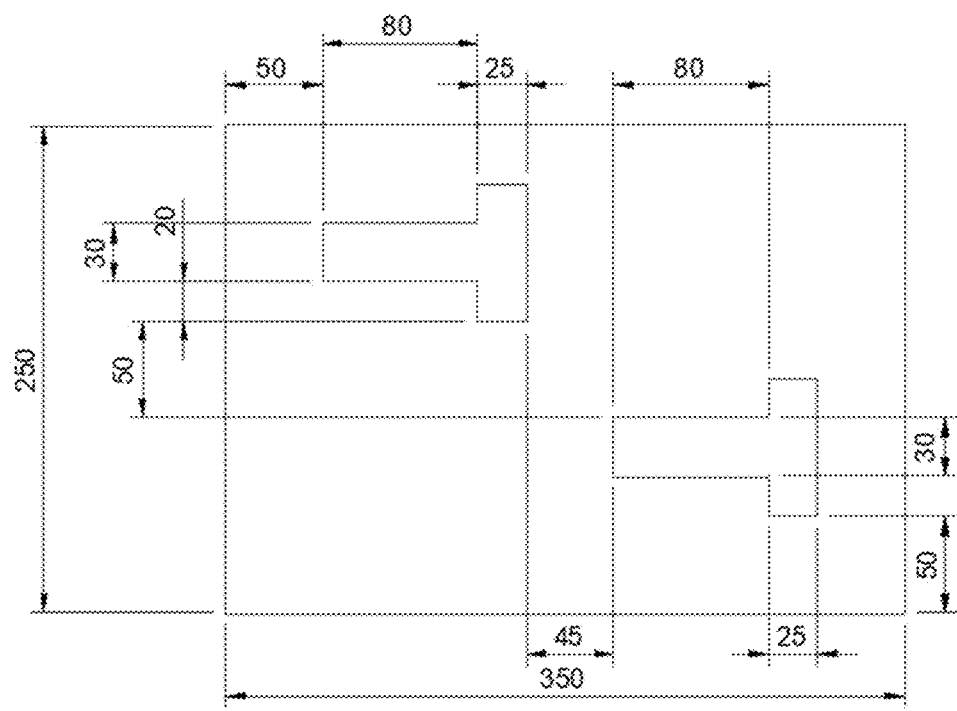
Figure 23C:
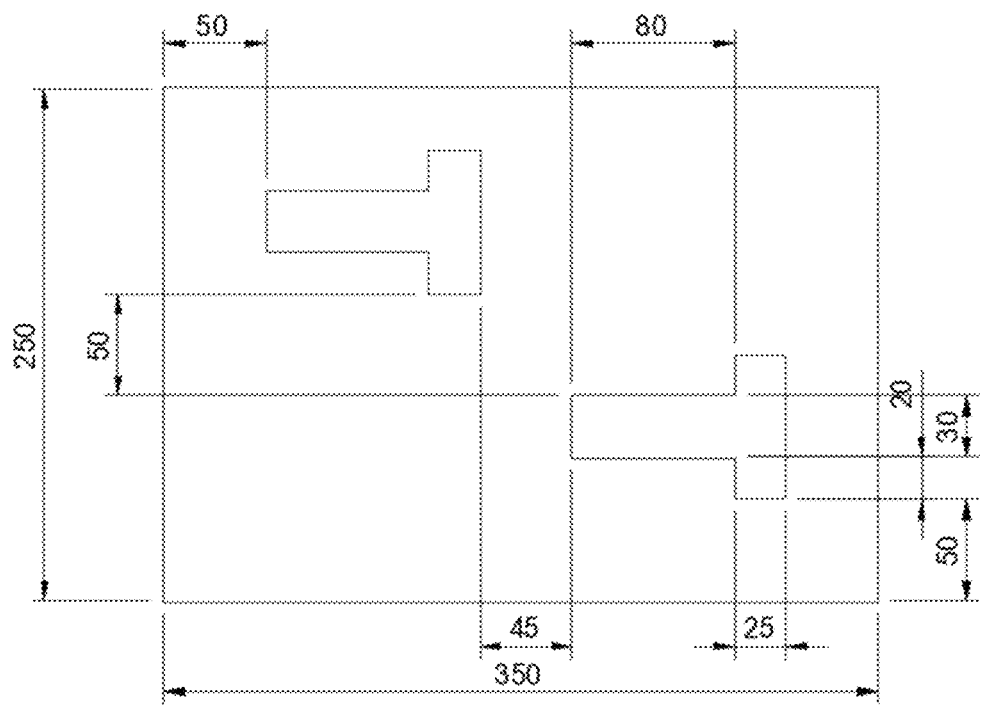

Referring again to FIG. 20—step 2006 determines whether the loops are symmetric across the same axis. The description below describes an algorithm for checking whether the loops are the same. In particular, with the cell map base loop generator described above, it was seen that the loops are identified in the drawing views. There could be multiple loops (especially internal loops) in the same view (for example, multiple similar slots in a part) and users would expect only one of the loops to be dimensioned. In this algorithm, embodiments of the invention use the cell map to identify the similar loops and store that information. This would later be used to make dimensions in both of the loops fungible. FIGS. 23A-23C illustrate a graphical example of a same loop check that is performed in accordance with one or more embodiments of the invention.

FIG. 23A illustrates an exemplary part where two internal slots are identical. When the identical loops are not identified, the output would look like that illustrated in FIG. 23B. It may be seen that both of the slots are dimensioned. When the identical loops are identified, the output looks as that illustrated in FIG. 23C. It can be seen that only one of the slots is dimensioned.

Symmetric Dimension Fungibility Algorithm

Figure 24A:
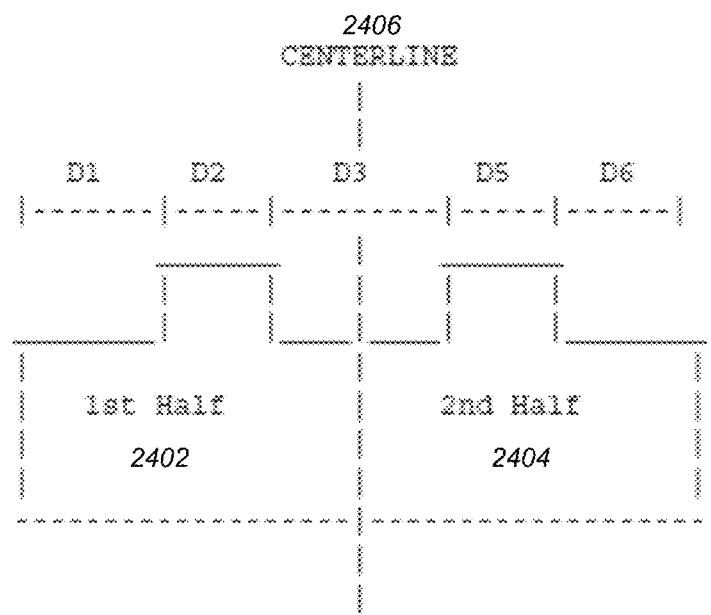
FIGS. 24A-24E illustrate graphical examples of symmetric dimension fungibility in accordance with one or more embodiments of the invention.

This is a type of dimension priority algorithm. It looks for the symmetric dimensions and makes them fungible. FIGS. 24A-24E illustrate graphical examples of symmetric dimension fungibility in accordance with one or more embodiments of the invention. FIG. 24A illustrates an example that is symmetric about the y-axis. The algorithm works on a per lop basis. First, it splits the dimensions in the $1^{st}$ half 2402 and $2^{nd}$ half 2404. The algorithm then compares the dimensions in the $1^{st}$ half 2402 to the $2^{nd}$ half 2404. The process loops on all dimensions and tries to match the distance of the start and end points of the dimensions from the center line 2406. When the distance matches, it may be concluded that the dimensions are symmetric to each other and they are made fungible.

Figure 24B:
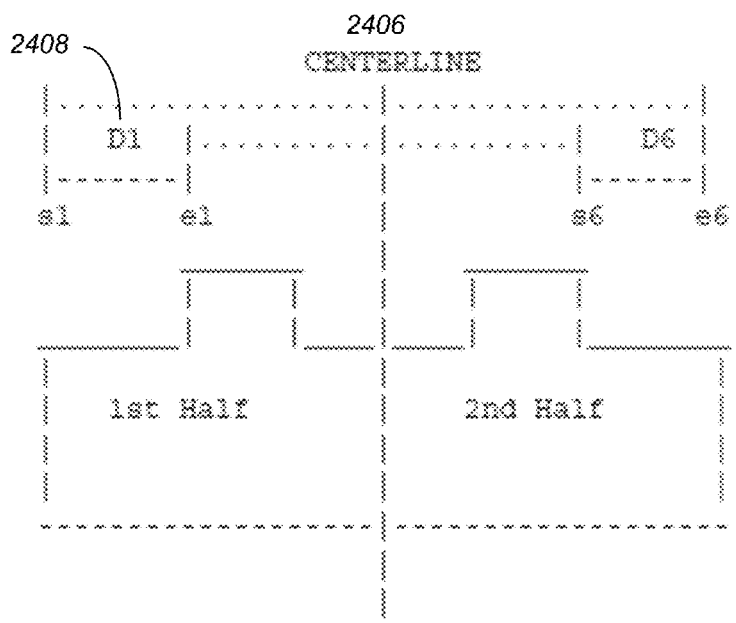
Figure 24C:
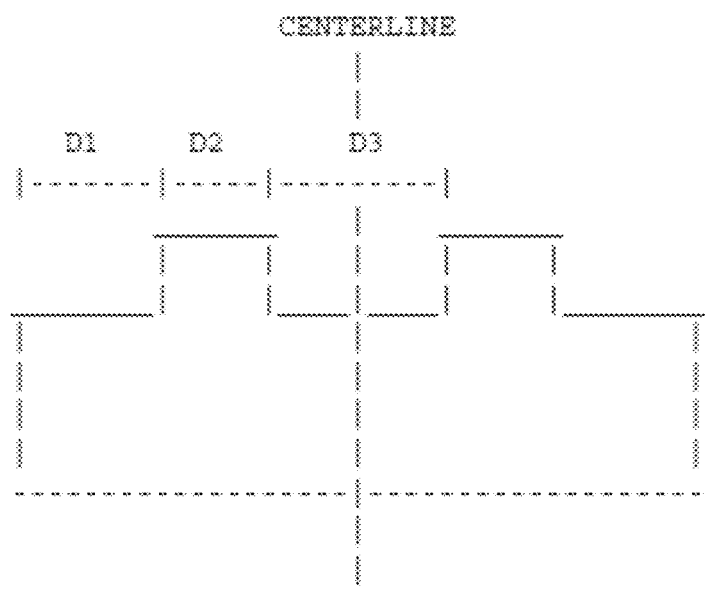

FIG. 24B illustrates an example where dimensions are found to be fungible. Consider the D1 dimension 2408. It can be seen that the distance between s1 and centerline 2406 and e6 and centerline 2406 matches. In addition, the distance between e1 and centerline 2406 and s6 and centerline 2406 matches. Consequently, D1 and D6 are made fungible. Similarly, it may be fond that D2 and D5 are symmetric and are made fungible. FIG. 24C illustrates a final output. In FIG. 24C, the dimensions are symmetric about the y-axis. the same approach may be used for the loop symmetric about the x-axis.

Figure 24D:
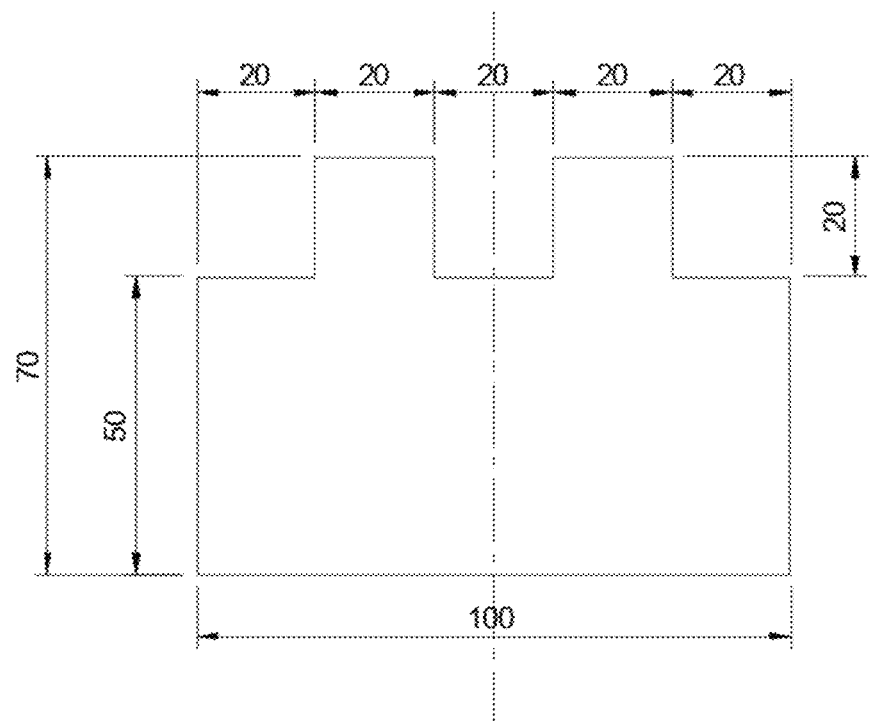
Figure 24E:
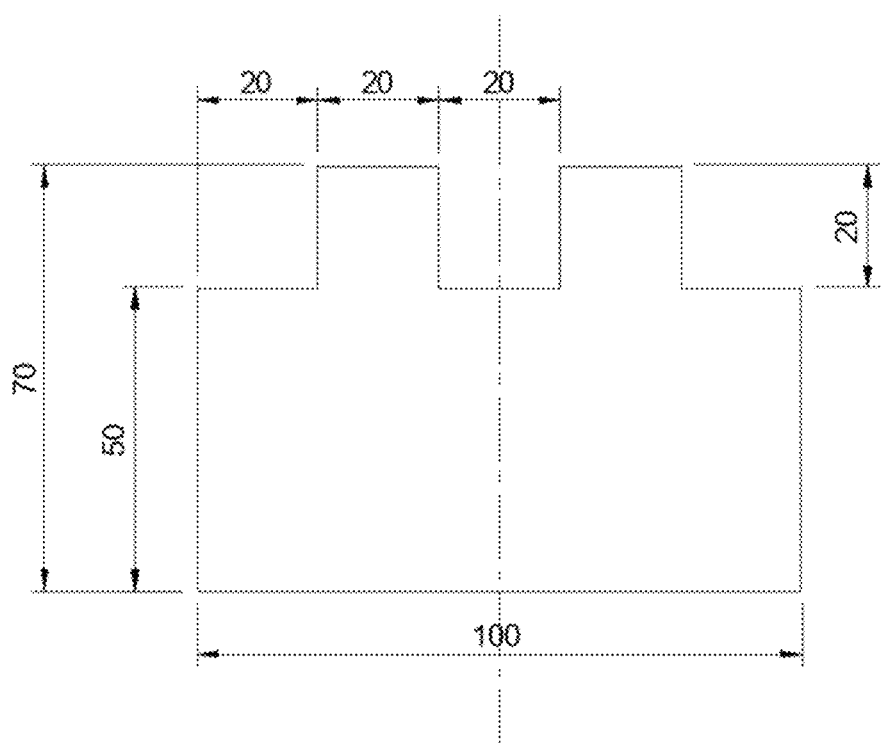

FIG. 24D shows the dimensions with a symmetric dimension fungibility algorithm disabled. In contrast, FIG. 24E shows a final output with a symmetric dimension fungibility algorithm enabled. As can be seen, when the symmetric dimension fungibility algorithm is enabled, the symmetric dimensions are not shown and do not cloud the drawing/view with dimensions such that the view is easier to read compared to a view where the symmetric dimension fungibility algorithm is disabled.

Symmetric with Baseline Dimension Generator Algorithm

Figure 25A:
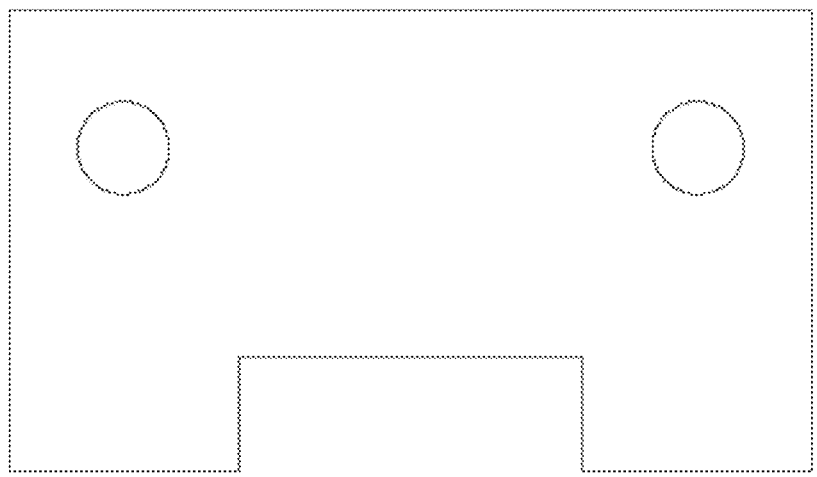
FIGS. 25A and 25B illustrate the use of a symmetric with baseline dimension generator algorithm in accordance with one or more embodiments of the invention.
Figure 25B:
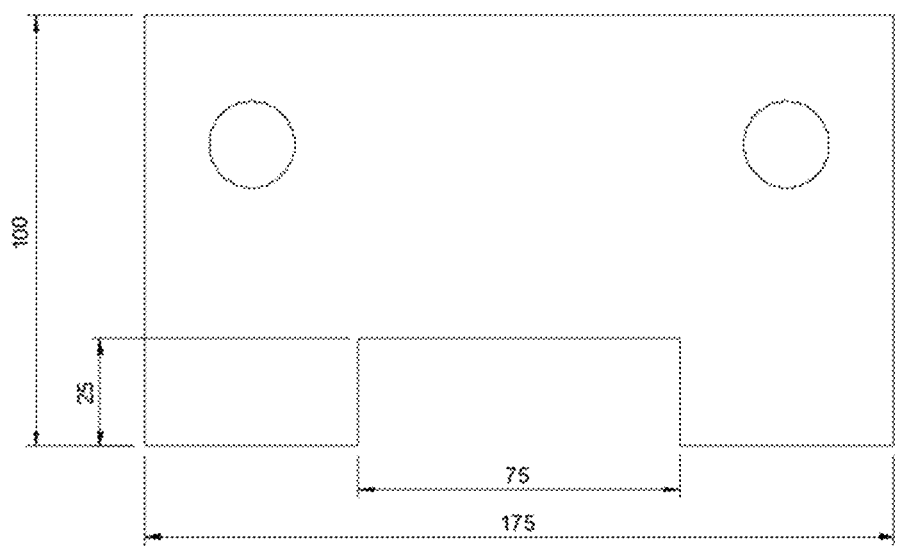

This algorithm is a type of dimension generator algorithm and runs on all of the symmetric contours about the x or y-axis. FIGS. 25A and 25B illustrate the use of a symmetric with baseline dimension generator algorithm in accordance with one or more embodiments of the invention.

In FIG. 25A, the view is symmetric about the y-axis and non-symmetric about the x-axis. This algorithm will put the symmetric dimensions in the horizontal direction and baseline dimensions in the vertical direction. FIG. 25B illustrates the final output for such generated dimensions.

Unique Section Generator Algorithm

This algorithm finds the unique section and stores it in a data structure. the algorithm runs on a per loop basis and finds unique sections in that loop and populates the data structure accordingly. There are two types of geometry—circular and linear. Cell maps are used to find whether a loop is circular or linear. A sequence of cell map operations are used to find the unique section.

Figure 26:
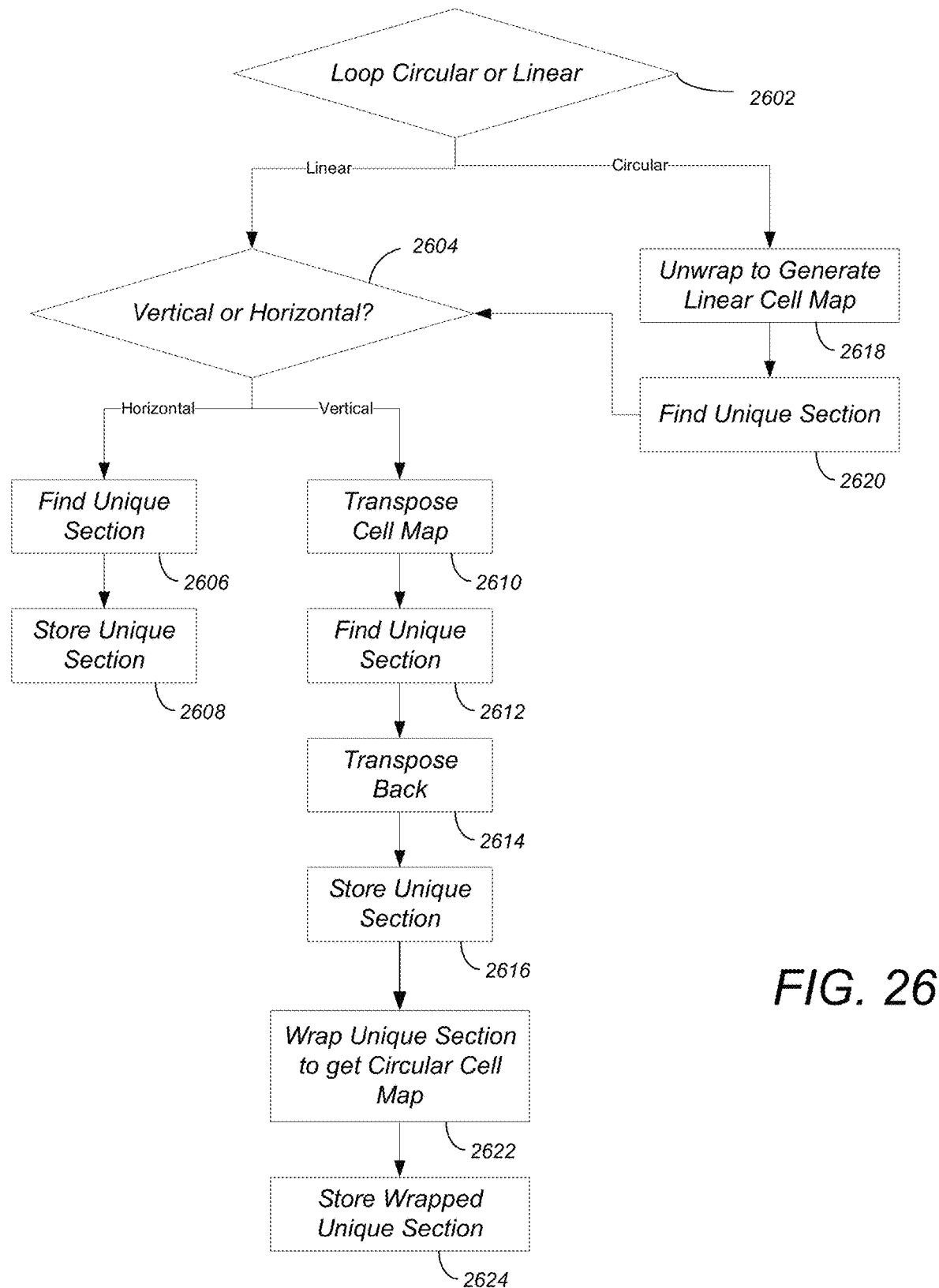
FIG. 26 illustrates the logical flow for generating unique sections in accordance with one or more embodiments of the invention.

FIG. 26 illustrates the logical flow for generating unique sections in accordance with one or more embodiments of the invention. At step 2602, a determination is made regarding whether a loop is circular or linear. If a loop is linear, a determination is made at step 2604 regarding whether the loop is vertical or horizontal considering the aspect ratio of a loop. If the loop is horizontal, the unique section is found at step 2606 and stored at step 2608. If the loop is vertical, the cell map is transposed at step 2610 and then the unique section is found at step 2612. Thereafter, it is transposed again at step 2614 to get back to the original orientation and then stored at step 2616.

If a loop is circular, the circular cell map is unwrapped to give the linear cell map at step 2618. The unique section is then identified at step 2620 (i.e., via steps 2604, 2606, and 2610-2614). If originally circular, the stored unique section is then wrapped to get the circular cell map at step 2622. Thereafter, the data is stored at step 2624.

Each unique section may have periodicity information and in one or more embodiments, only the first unique section may be stored.

Figure 27A:
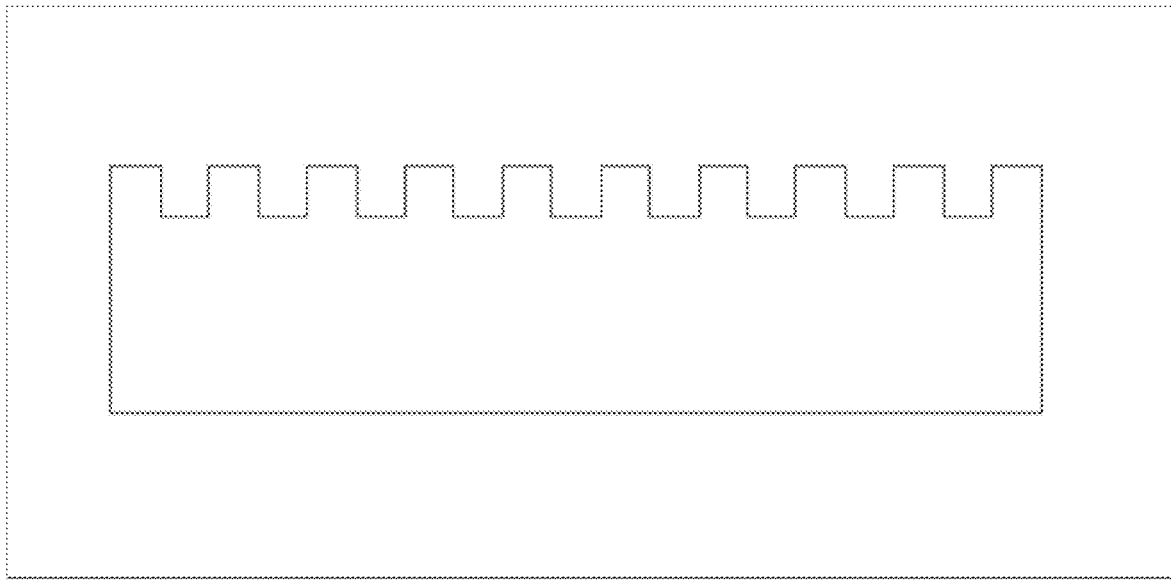
FIGS. 27A-27B and 28A-28E illustrate examples of the application of the unique section generator algorithm in accordance with one or more embodiments of the invention.
Figure 27B:
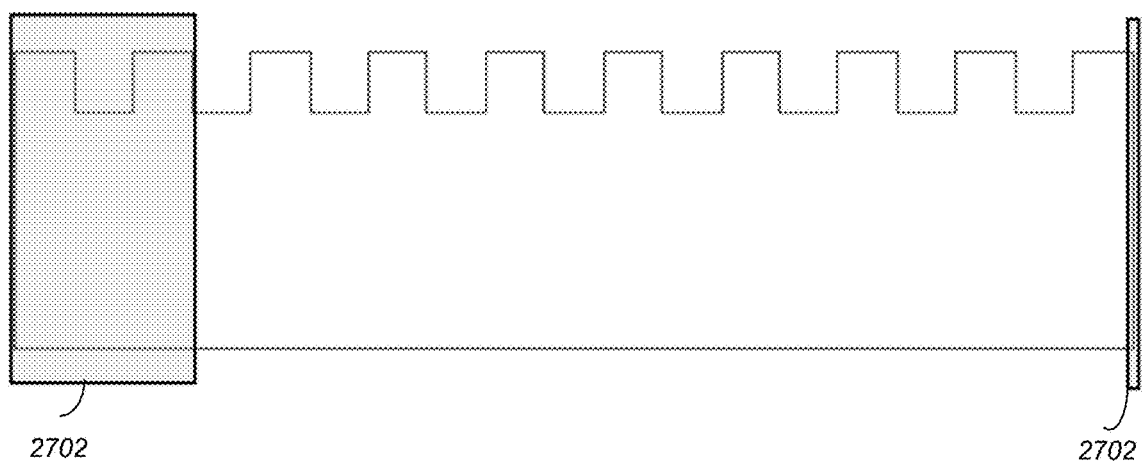

FIGS. 27A-27B and 28A-28E illustrate examples of the application of the unique section generator algorithm in accordance with one or more embodiments of the invention. FIG. 27A illustrates a linear geometry example while FIG. 27B illustrates the identification of the unique sections 2702 of the linear geometry of FIG. 27A.

Figure 28A:
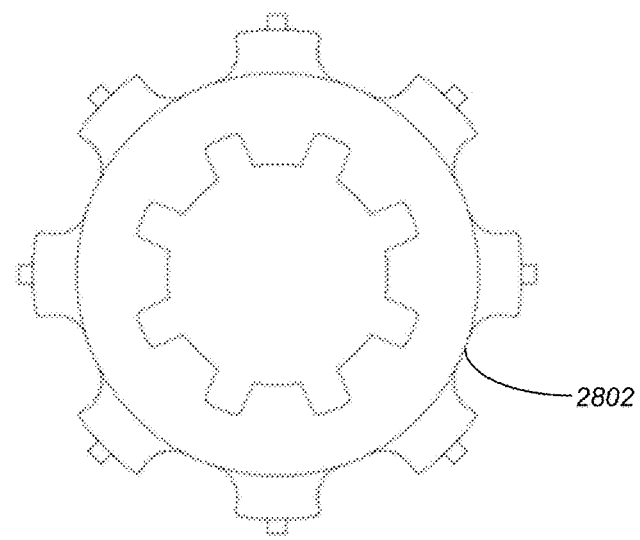
Figure 28B:
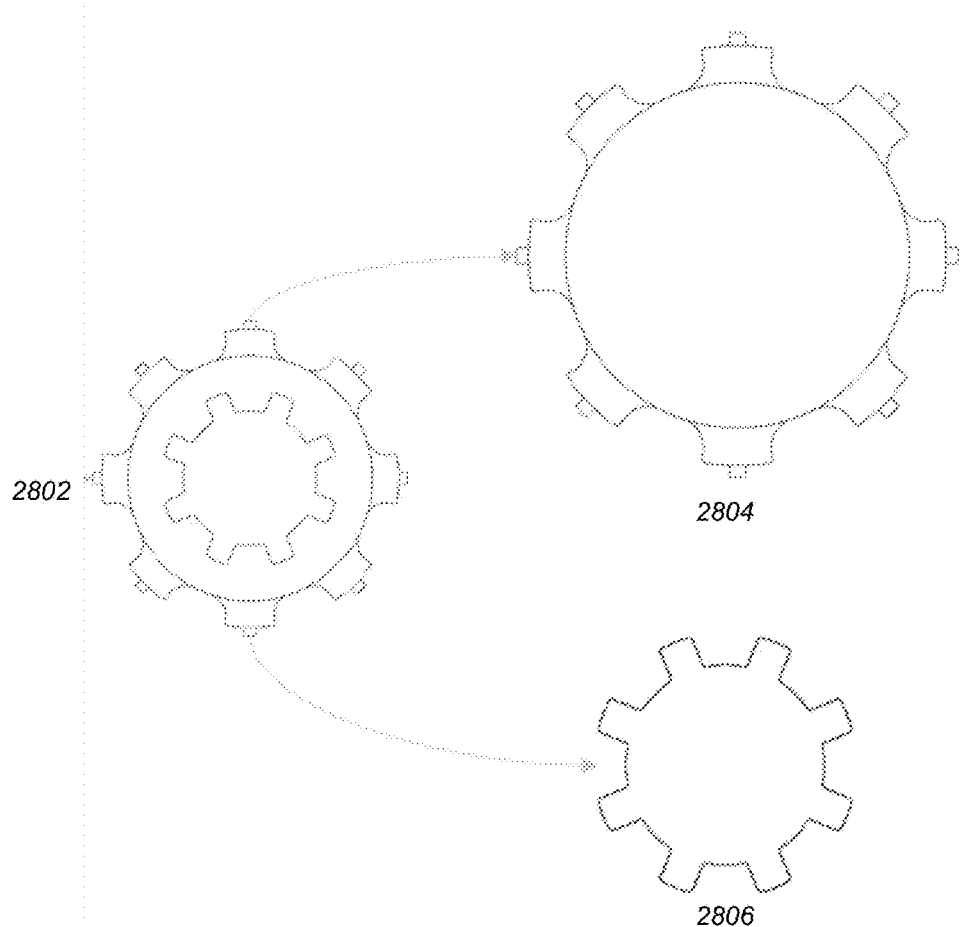
Figure 28C:
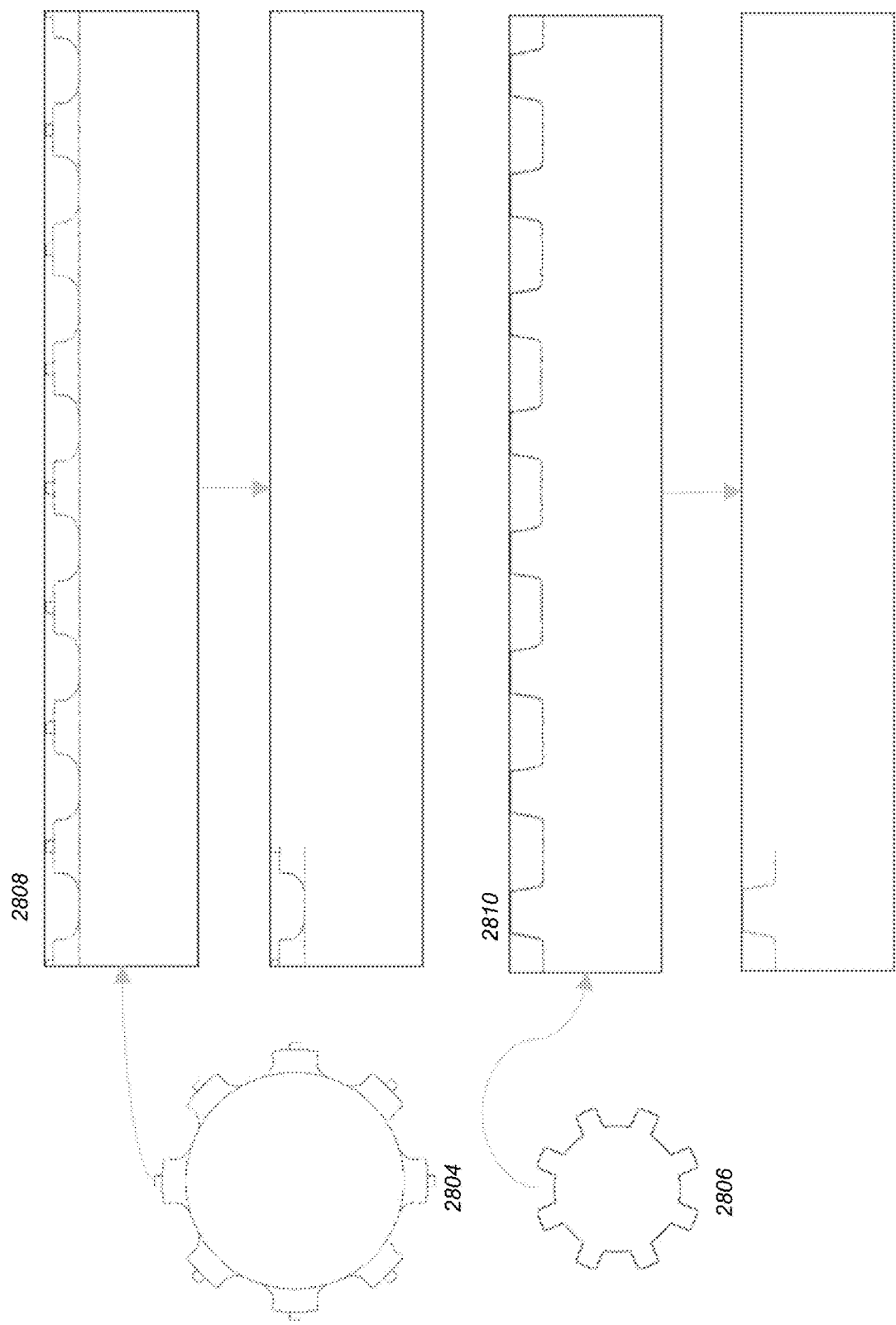
Figure 28D:
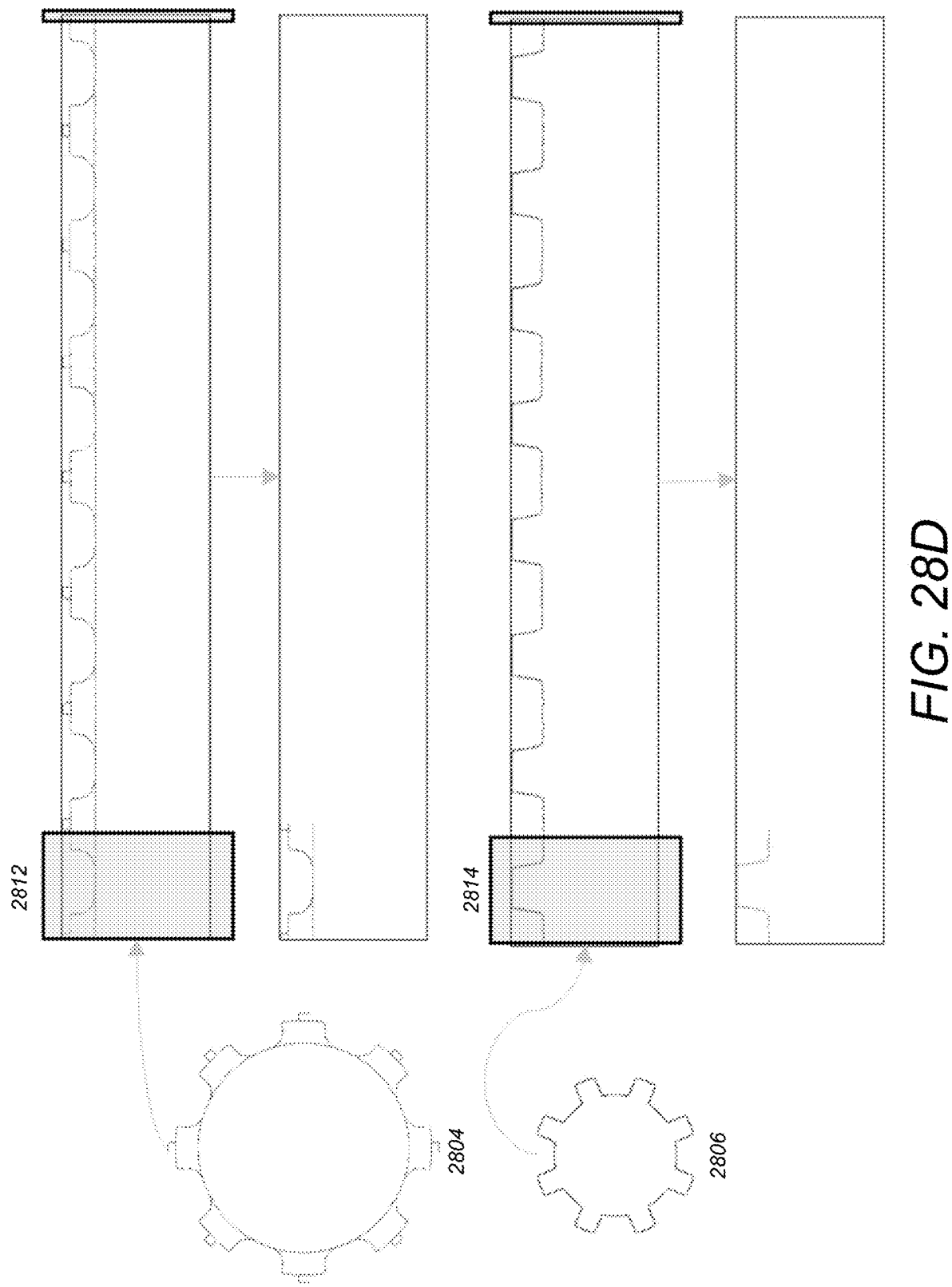
Figure 28E:
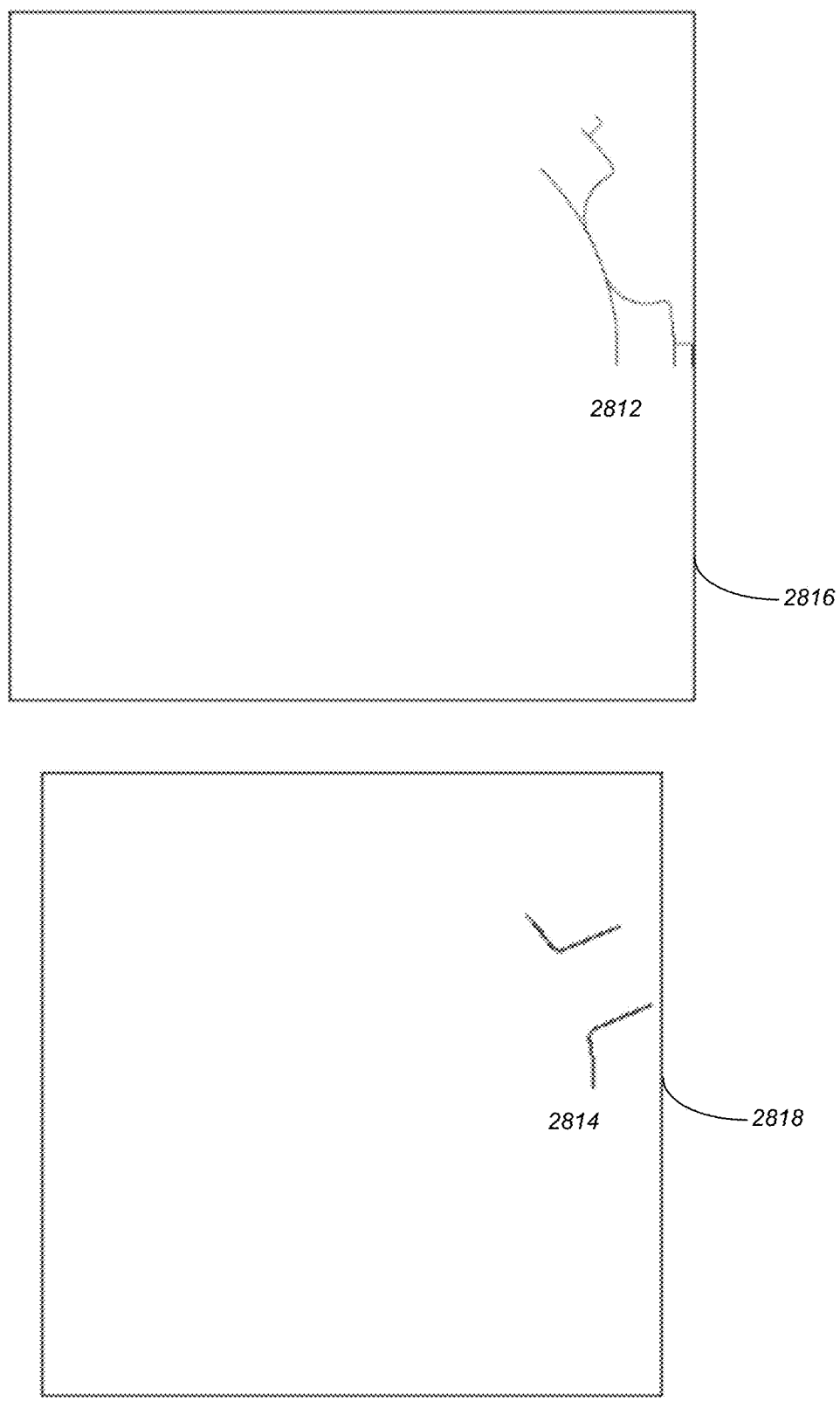

FIGS. 28A-28E illustrate a circular example. In FIG. 28A illustrates the circular geometry 2802 that is used to generated a cell map. In FIG. 28B, the circular geometry 2802 is split into loops 2804 and 2806. The individual loops 2804 and 2806 are unwrapped into linear loops 2808 and 2810 as illustrated in FIG. 28C. Unique sections 2812-2814 are then identified in the linear loops 2808 and 2810 as illustrated in FIG. 28D. Thereafter, the linear loops are wrapped 2816 and 2818 again to get the circular unique section as illustrated in FIG. 28E. Finally, the unique sections 2816 and 2818 are stored in a data structure.

Hardware Embodiments

Figure 29:
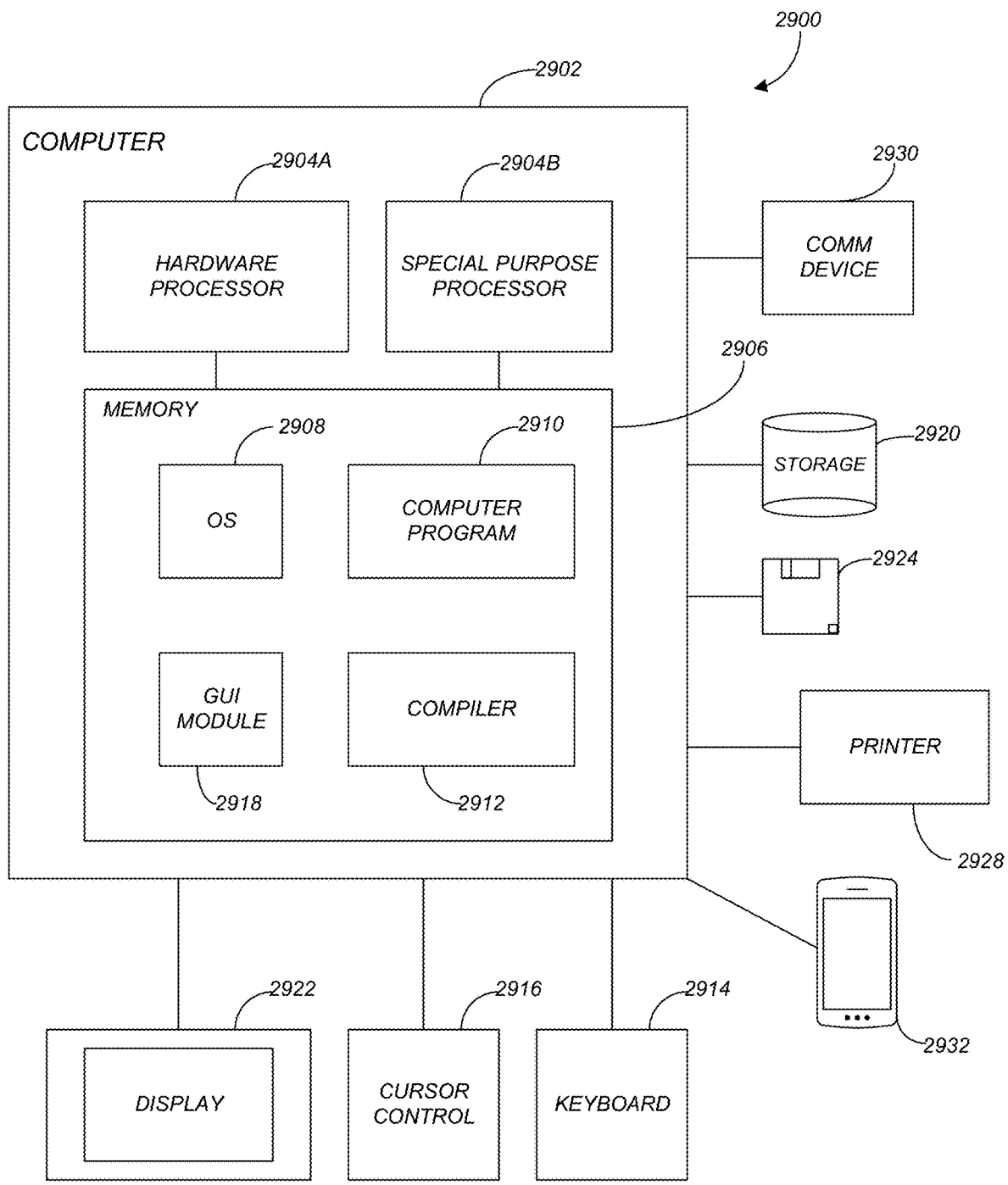
FIG. 29 is an exemplary hardware and software environment used to implement one or more embodiments of the invention.

FIG. 29 is an exemplary hardware and software environment 2900 (referred to as a computer-implemented system and/or computer-implemented method) used to implement one or more embodiments of the invention. The hardware and software environment includes a computer 2902 and may include peripherals. Computer 2902 may be a user/client computer, server computer, or may be a database computer. The computer 2902 comprises a hardware processor 2904A and/or a special purpose hardware processor 2904B (hereinafter alternatively collectively referred to as processor 2904) and a memory 2906, such as random access memory (RAM). The computer 2902 may be coupled to, and/or integrated with, other devices, including input/output (I/O) devices such as a keyboard 2914, a cursor control device 2916 (e.g., a mouse, a pointing device, pen and tablet, touch screen, multi-touch device, etc.) and a printer 2928. In one or more embodiments, computer 2902 may be coupled to, or may comprise, a portable or media viewing/listening device 2932 (e.g., an MP3 player, IPOD, NOOK, portable digital video player, cellular device, personal digital assistant, etc.). In yet another embodiment, the computer 2902 may comprise a multi-touch device, mobile phone, gaming system, internet enabled television, television set top box, or other internet enabled device executing on various platforms and operating systems.

In one embodiment, the computer 2902 operates by the hardware processor 2904A performing instructions defined by the computer program 2910 (e.g., a computer-aided design [CAD] application) under control of an operating system 2908. The computer program 2910 and/or the operating system 2908 may be stored in the memory 2906 and may interface with the user and/or other devices to accept input and commands and, based on such input and commands and the instructions defined by the computer program 2910 and operating system 2908, to provide output and results.

Output/results may be presented on the display 2922 or provided to another device for presentation or further processing or action. In one embodiment, the display 2922 comprises a liquid crystal display (LCD) having a plurality of separately addressable liquid crystals. Alternatively, the display 2922 may comprise a light emitting diode (LED) display having clusters of red, green and blue diodes driven together to form full-color pixels. Each liquid crystal or pixel of the display 2922 changes to an opaque or translucent state to form a part of the image on the display in response to the data or information generated by the processor 2904 from the application of the instructions of the computer program 2910 and/or operating system 2908 to the input and commands. The image may be provided through a graphical user interface (GUI) module 2918. Although the GUI module 2918 is depicted as a separate module, the instructions performing the GUI functions can be resident or distributed in the operating system 2908, the computer program 2910, or implemented with special purpose memory and processors.

In one or more embodiments, the display 2922 is integrated with/into the computer 2902 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 2902 according to the computer program 2910 instructions may be implemented in a special purpose processor 2904B. In this embodiment, some or all of the computer program 2910 instructions may be implemented via firmware instructions stored in a read only memory (ROM), a programmable read only memory (PROM) or flash memory within the special purpose processor 2904B or in memory 2906. The special purpose processor 2904B may also be hardwired through circuit design to perform some or all of the operations to implement the present invention. Further, the special purpose processor 2904B may be a hybrid processor, which includes dedicated circuitry for performing a subset of functions, and other circuits for performing more general functions such as responding to computer program 2910 instructions. In one embodiment, the special purpose processor 2904B is an application specific integrated circuit (ASIC).

The computer 2902 may also implement a compiler 2912 that allows an application or computer program 2910 written in a programming language such as C, C++, Assembly, SQL, PYTHON, PROLOG, MATLAB, RUBY, RAILS, HASKELL, or other language to be translated into processor 2904 readable code. Alternatively, the compiler 2912 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 2910 accesses and manipulates data accepted from I/O devices and stored in the memory 2906 of the computer 2902 using the relationships and logic that were generated using the compiler 2912.

The computer 2902 also optionally comprises an external communication device such as a modem, satellite link, Ethernet card, or other device for accepting input from, and providing output to, other computers 2902.

In one embodiment, instructions implementing the operating system 2908, the computer program 2910, and the compiler 2912 are tangibly embodied in a non-transitory computer-readable medium, e.g., data storage device 2920, which could include one or more fixed or removable data storage devices, such as a zip drive, floppy disc drive 2924, hard drive, CD-ROM drive, tape drive, etc. Further, the operating system 2908 and the computer program 2910 are comprised of computer program 2910 instructions which, when accessed, read and executed by the computer 2902, cause the computer 2902 to perform the steps necessary to implement and/or use the present invention or to load the program of instructions into a memory 2906, thus creating a special purpose data structure causing the computer 2902 to operate as a specially programmed computer executing the method steps described herein. Computer program 2910 and/or operating instructions may also be tangibly embodied in memory 2906 and/or data communications devices 2930, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 2902.

Figure 30:
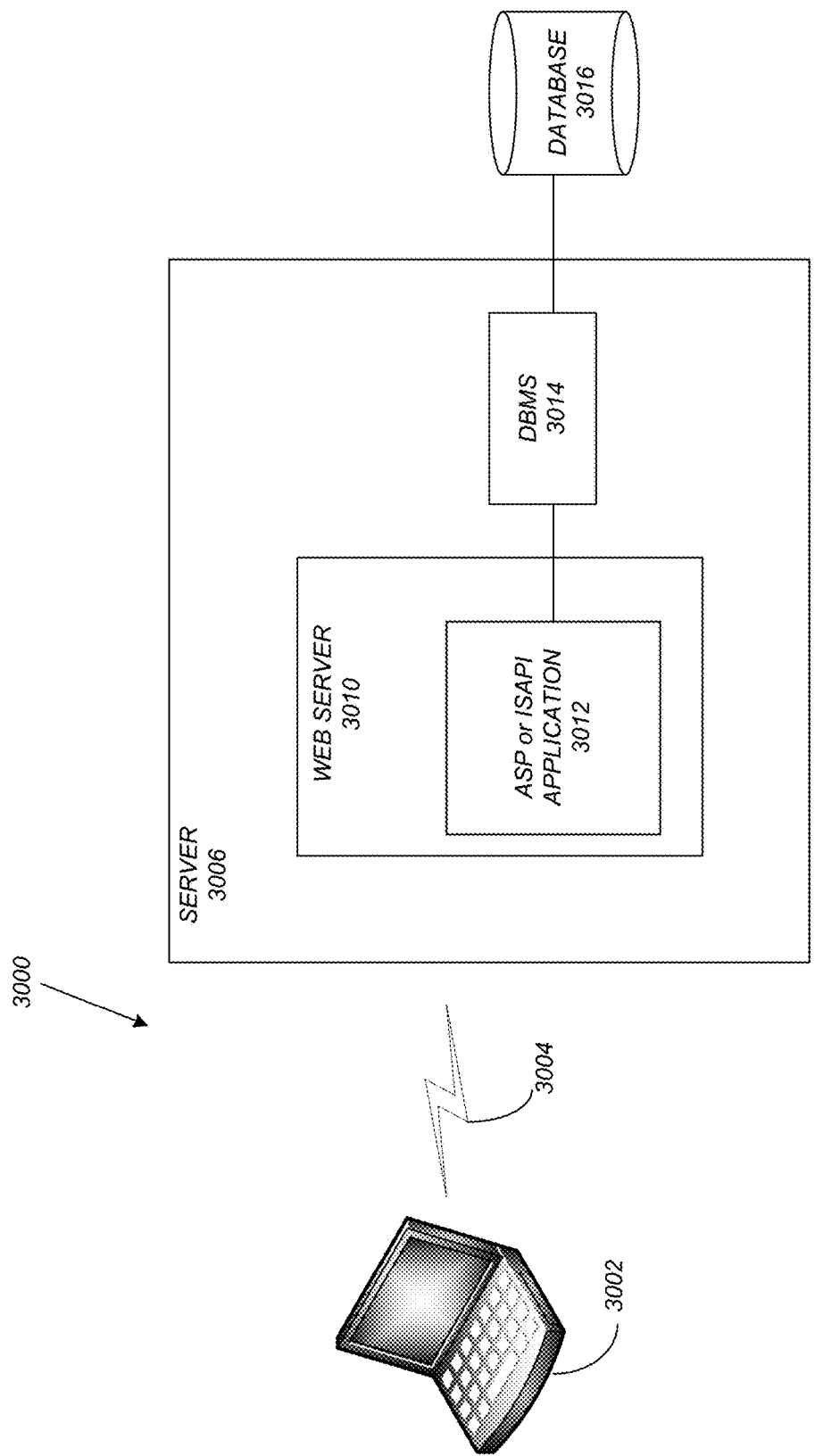
FIG. 30 schematically illustrates a typical distributed/cloud-based computer system in accordance with one or more embodiments of the invention.

FIG. 30 schematically illustrates a typical distributed/cloud-based computer system 3000 using a network 3004 to connect client computers 3002 to server computers 3006. A typical combination of resources may include a network 3004 comprising the Internet, LANs (local area networks), WANs (wide area networks), SNA (systems network architecture) networks, or the like, clients 3002 that are personal computers or workstations (as set forth in FIG. 29), and servers 3006 that are personal computers, workstations, minicomputers, or mainframes (as set forth in FIG. 29). However, it may be noted that different networks such as a cellular network (e.g., GSM [global system for mobile communications] or otherwise), a satellite based network, or any other type of network may be used to connect clients 3002 and servers 3006 in accordance with embodiments of the invention.

A network 3004 such as the Internet connects clients 3002 to server computers 3006. Network 3004 may utilize ethernet, coaxial cable, wireless communications, radio frequency (RF), etc. to connect and provide the communication between clients 3002 and servers 3006. Further, in a cloud-based computing system, resources (e.g., storage, processors, applications, memory, infrastructure, etc.) in clients 3002 and server computers 3006 may be shared by clients 3002, server computers 3006, and users across one or more networks. Resources may be shared by multiple users and can be dynamically reallocated per demand. In this regard, cloud computing may be referred to as a model for enabling access to a shared pool of configurable computing resources.

Clients 3002 may execute a client application or web browser and communicate with server computers 3006 executing web servers 3010. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 3002 may be downloaded from server computer 3006 to client computers 3002 and installed as a plug-in or ACTIVEX control of a web browser. Accordingly, clients 3002 may utilize ACTIVEX components/component object model (COM) or distributed COM (DCOM) components to provide a user interface on a display of client 3002. The web server 3010 is typically a program such as MICROSOFT'S INTERNET INFORMATION SERVER.

Web server 3010 may host an Active Server Page (ASP) or Internet Server Application Programming Interface (ISAPI) application 3012, which may be executing scripts. The scripts invoke objects that execute business logic (referred to as business objects). The business objects then manipulate data in database 3016 through a database management system (DBMS) 3014. Alternatively, database 3016 may be part of, or connected directly to, client 3002 instead of communicating/obtaining the information from database 3016 across network 3004. When a developer encapsulates the business functionality into objects, the system may be referred to as a component object model (COM) system. Accordingly, the scripts executing on web server 3010 (and/or application 3012) invoke COM objects that implement the business logic. Further, server 3006 may utilize MICROSOFT'S TRANSACTION SERVER (MTS) to access required data stored in database 3016 via an interface such as ADO (Active Data Objects), OLE DB (Object Linking and Embedding DataBase), or ODBC (Open DataBase Connectivity).

Generally, these components 3000-3016 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 3002 and 3006 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 3002 and 3006. Embodiments of the invention are implemented as a software/CAD application on a client 3002 or server computer 3006. Further, as described above, the client 3002 or server computer 3006 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In view of the above, embodiments of the invention quantize the geometry and represent such quantization in a unique form (referred to as a geometric cell map). Geometry data is usually represented as conventional geometry data structures like lines, arcs, and circles. The quantized form for the drawing domain specifically is unique. The determination of human intuition is achievable via the use of cell maps which is a concept that is platform, application, and language agnostic. Further, cell maps may be improved over time, are flexible, operations can be performed in parallel, and multiple algorithms can run simultaneously while providing end users with choices to select a preferred option. In addition, the manner in which embodiments of the invention identify how to break a part is unique. Further, finding out/identifying the unique section within a part is also unique. Such capabilities may same almost 40-60% of the time users may have to spend to perform the same operations manually.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for automating drawing, comprising:
   (a) obtaining a drawing comprised of two or more entities;
   (b) determining a resolution;
   (c) based on the resolution, quantizing the drawing into a cell map stored in a contiguous memory, wherein:
      (i) the cell map comprises a collection of multiple cells stored in the contiguous memory;
      (ii) each of the multiple cells comprises an encoded value representing quantized geometry data and domain-specific information for a corresponding entity of the two or more entities;
      (iii) each of the multiple cells comprises a smallest tangible unit of information about the corresponding entity;
      (iv) the quantizing comprises a rounding off of values beyond a specified threshold to a resolution tolerance of the resolution; and
   (d) utilizing the cell map to automate modifications to the drawing, wherein the utilizing the cell map stored in contiguous memory enables automated modifications to the drawing without requiring a conventional boundary representation.

2. The computer-implemented method of claim 1, wherein the determining the resolution comprises:
   obtaining a bounding box of the drawing;
   obtaining a cell size flag value that specifies a level of desired granularity for the cell map;
   determining a maximum number of rows or columns for the cell map; and
   based on the maximum number of rows or columns, the cell size flag, and the bounding box, calculating the resolution as:

resolution=max(bounding-box-length,bounding-box-width)/maximum-rows-or-columns.

3. The computer-implemented method of claim 1, wherein the utilizing the cell map to automate modifications comprises:
    collecting a view chain and determining whether an entity is to be broken horizontally or vertically;
    collecting views of the two or more entities to break;
    isolating geometry in the cell map;
    merging the collected views together; and
    identifying, based on the isolated geometry in the cell map, unique sections of the two to more entities on all of the merged collected views.

4. The computer-implemented method of claim 3, wherein the identifying the unique sections comprises:
    confirming that a defined wavelength is correct with respect to the cell map;
    confirming that a defined tolerance is correct with respect to the cell map;
    traversing the cell map while comparing columns based on the defined wavelength and defined tolerance to determine a number of consecutive matching values; and
    determining and returning a final value for the defined wavelength based on a maximum number of consecutive matching values.

5. The computer-implemented method of claim 1, wherein:
    the quantizing the drawing comprises:
        creating the cell map based on a view of the drawing and one or more annotations or dimensions;
        masking the cell map to remove a set of details;
        creating a filled cell map out of the masked cell map;
        iterating over each of the one or more annotations or dimensions, wherein during the iterating:
            one or more of the annotations or dimensions are cloned;
            creating a line cell map comprised of potential candidate locations for the one or more annotations or dimensions;
    the utilizing the cell map to automate modifications comprises, during the iterating:
        determining one or more intersections of the line cell map and the filled cell map, wherein the intersections identify a subset of the candidate locations for the one or more annotations or dimensions;
        determining for each candidate location in the subset whether there is overlap; and
        identifying the candidate locations in the subset without any overlap as the locations for the one or more annotation or dimensions.

6. The computer-implemented method of claim 1, wherein:
    the quantizing the drawing comprises:
        collecting one or more views from the drawing;
        determining a padding for the one or more views;
        applying the padding to the one or more views to generate padded views;
        generating, from the padded views, padded cell maps, wherein the cell map comprises a combination of the padded cell maps;
        merging the padded cell maps together into a merged padded cell map;
    the utilizing the cell map to automate modifications comprises:
        finding a sheet cell map without the one or more views; and
        identifying an empty space in the sheet cell map where the merged padded cell map fits without overlapping anything.

7. The computer-implemented method of claim 1, wherein the utilizing the cell map to automate modifications comprises:
    masking the cell map for each view of the drawing;
    grouping views of the drawing into horizontal and vertical groups;
    determining, based on the masked cell maps, that one or more of the views in the horizontal and vertical groups are fungible; and
    removing the fungible views.

8. The computer-implemented method of claim 7, wherein the determining that one or more of the views are fungible comprises:
    comparing two cell maps for two of the views, wherein the comparing comprises:
        comparing cell counts for the two cell maps to determine whether the cell counts are different, wherein different cell counts indicates that the two views are not fungible;
        generating a union of the two cell maps;
        determining whether the union matches either of the two views, wherein a match indicates of the two cell maps is contained in the other of the two cell maps; and
        comparing rotated versions of the two cell maps to determine if they match, wherein matching rotated versions indicates fungibility.

9. The computer-implemented method of claim 1, wherein the utilizing the cell map to automate modifications comprises:
    identifying a single body in the drawing;
    determining that the cell map has two or more distinct loops;
    determining that the two or more distinct loops are symmetric across a same axis;
    grouping same x-horizontally symmetric loops together and same y-vertically symmetric loops together;
    creating groups using unique cells of the cell map;
    determining that same x-horizontally symmetric loops or same y-vertically symmetric loops have a same center; and
    based on the same center, generating a section view.

10. The computer-implemented method of claim 1, wherein:
    the quantizing the drawing comprises:
        creating the cell map based on a view of the drawing;
    the utilizing the cell map to automate modifications comprises:
        detecting, based on the cell map, one or more loops of the view;
        exploding each of the one or more loops to separate the cell map;
        determining whether each non-fungible point is present in the exploded one or more loops, wherein at least one of the non-fungible points is present; and
        for each non-fungible point present in the exploded one or more loops, mapping the non-fungible point to the exploded loop in which it is present.

11. The computer-implemented method of claim 10, further comprising:
    identifying loops that are similar based on the cell map; and
    storing information about similar loops.

12. A computer-implemented system for automating drawing, comprising:
- (a) a computer having a contiguous memory;
- (b) a processor executing on the computer;
- (c) the memory storing a set of instructions, wherein the set of instructions, when executed by the processor cause the processor to perform operations comprising:
  - (i) obtaining a drawing comprised of two or more entities;
  - (ii) determining a resolution;
  - (iii) based on the resolution, quantizing the drawing into a cell map stored in the contiguous memory, wherein:
    - (A) the cell map comprises a collection of multiple cells stored in the contiguous memory;
    - (B) each of the multiple cells comprises an encoded value representing quantized geometry data and domain specific information for a corresponding entity of the two or more entities;
    - (C) each of the multiple cells comprises a smallest tangible unit of information about the corresponding entity;
    - (D) the quantizing comprises a rounding off of values beyond a specified threshold to a resolution tolerance of the resolution; and
  - (iv) utilizing the cell map to automate modifications to the drawing, wherein the utilizing the cell map stored in contiguous memory enables automated modifications to the drawing without requiring a conventional boundary representation.

13. The computer-implemented system of claim 12, wherein the operations for determining the resolution comprise:
- obtaining a bounding box of the drawing;
- obtaining a cell size flag value that specifies a level of desired granularity for the cell map;
- determining a maximum number of rows or columns for the cell map; and
- based on the maximum number of rows or columns, the cell size flag, and the bounding box, calculating the resolution as:

resolution=max(bounding-box-length,bounding-box-width)/maximum-rows-or-columns.

14. The computer-implemented system of claim 12, wherein the operations for utilizing the cell map to automate modifications comprise:
- collecting a view chain and determining whether an entity is to be broken horizontally or vertically;
- collecting views of the two or more entities to break;
- isolating geometry in the cell map;
- merging the collected views together; and
- identifying, based on the isolated geometry in the cell map, unique sections of the two to more entities on all of the merged collected views.

15. The computer-implemented system of claim 14, wherein the identifying the unique sections comprises:
- confirming that a defined wavelength is correct with respect to the cell map;
- confirming that a defined tolerance is correct with respect to the cell map;
- traversing the cell map while comparing columns based on the defined wavelength and defined tolerance to determine a number of consecutive matching values; and
- determining and returning a final value for the defined wavelength based on a maximum number of consecutive matching values.

16. The computer-implemented system of claim 12, wherein:
- the operations for quantizing the drawing comprise:
  - creating the cell map based on a view of the drawing and one or more annotations or dimensions;
  - masking the cell map to remove a set of details;
  - creating a filled cell map out of the masked cell map;
  - iterating over each of the one or more annotations or dimensions, wherein during the iterating:
    - one or more of the annotations or dimensions are cloned;
    - creating a line cell map comprised of potential candidate locations for the one or more annotations or dimensions;
- the operations for utilizing the cell map to automate modifications comprise, during the iterating:
  - determining one or more intersections of the line cell map and the filled cell map, wherein the intersections identify a subset of the candidate locations for the one or more annotations or dimensions;
  - determining for each candidate location in the subset whether there is overlap; and
  - identifying the candidate locations in the subset without any overlap as the locations for the one or more annotation or dimensions.

17. The computer-implemented system of claim 12, wherein:
- the operations for quantizing the drawing comprise:
  - collecting one or more views from the drawing;
  - determining a padding for the one or more views;
  - applying the padding to the one or more views to generate padded views;
  - generating, from the padded views, padded cell maps, wherein the cell map comprises a combination of the padded cell maps;
  - merging the padded cell maps together into a merged padded cell map;
- the operations for utilizing the cell map to automate modifications comprise:
  - finding a sheet cell map without the one or more views; and
  - identifying an empty space in the sheet cell map where the merged padded cell map fits without overlapping anything.

18. The computer-implemented system of claim 12, wherein the operations for utilizing the cell map to automate modifications comprise:
- masking the cell map for each view of the drawing;
- grouping views of the drawing into horizontal and vertical groups;
- determining, based on the masked cell maps, that one or more of the views in the horizontal and vertical groups are fungible; and
- removing the fungible views.

19. The computer-implemented system of claim 18, wherein the determining that one or more of the views are fungible comprises:
- comparing two cell maps for two of the views, wherein the comparing comprises:
  - comparing cell counts for the two cell maps to determine whether the cell counts are different, wherein different cell counts indicates that the two views are not fungible;
  - generating a union of the two cell maps;

determining whether the union matches either of the two views, wherein a match indicates of the two cell maps is contained in the other of the two cell maps; and comparing rotated versions of the two cell maps to determine if they match, wherein matching rotated versions indicates fungibility.

20. The computer-implemented system of claim 12, wherein the operations for utilizing the cell map to automate modifications comprise:

identifying a single body in the drawing;

determining that the cell map has two or more distinct loops;

determining that the two or more distinct loops are symmetric across a same axis;

grouping same x-horizontally symmetric loops together and same y-vertically symmetric loops together;

creating groups using unique cells of the cell map;

determining that same x-horizontally symmetric loops or same y-vertically symmetric loops have a same center; and based on the same center, generating a section view.

21. The computer-implemented system of claim 12, wherein:

the operations for quantizing the drawing comprise:

creating the cell map based on a view of the drawing;

the operations for utilizing the cell map to automate modifications comprise:

detecting, based on the cell map, one or more loops of the view;

exploding each of the one or more loops to separate the cell map;

determining whether each non-fungible point is present in the exploded one or more loops, wherein at least one of the non-fungible points is present; and for each non-fungible point present in the exploded one or more loops, mapping the non-fungible point to the exploded loop in which it is present.

22. The computer-implemented system of claim 21, wherein the operations further comprise:

identifying loops that are similar based on the cell map; and storing information about similar loops.

* * * * *